(12) United States Patent
Nakamura et al.

(10) Patent No.: US 8,171,506 B2
(45) Date of Patent: May 1, 2012

(54) OPTICAL-SYSTEM DRIVING DEVICE EFFECTING SWITCHOVER BETWEEN OBJECTIVE LENSES FOR ACHIEVING FOCAL SPOTS

(75) Inventors: Keiji Nakamura, Tokyo (JP); Mitoru Yabe, Tokyo (JP); Nobuo Takeshita, Tokyo (JP); Toshiya Matozaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1106 days.

(21) Appl. No.: 11/989,584

(22) PCT Filed: Jun. 5, 2006

(86) PCT No.: PCT/JP2006/311211
§ 371 (c)(1),
(2), (4) Date: Jan. 28, 2008

(87) PCT Pub. No.: WO2007/020742
PCT Pub. Date: Feb. 22, 2007

(65) Prior Publication Data
US 2010/0162282 A1    Jun. 24, 2010

(30) Foreign Application Priority Data

Aug. 18, 2005   (JP) ................................. 2005-237877
Aug. 18, 2005   (JP) ................................. 2005-237878

(51) Int. Cl.
*G11B 7/00* (2006.01)

(52) U.S. Cl. ..................................... 720/681; 369/44.22

(58) Field of Classification Search .................. 720/681, 720/683, 689; 359/821; 369/44.17, 44.22
See application file for complete search history.

(56) References Cited

U.S. PATENT DOCUMENTS

| 5,687,154 | A | * | 11/1997 | Tsuchiya et al. | 369/44.23 |
| 5,815,328 | A | * | 9/1998 | Makita | 359/824 |
| 5,986,984 | A | * | 11/1999 | Nakamura et al. | 369/44.23 |
| 2005/0185531 | A1 | * | 8/2005 | Jang et al. | 369/44.22 |

FOREIGN PATENT DOCUMENTS

| JP | 9-81947 A | 3/1997 |
| JP | 9-120559 A | 5/1997 |
| JP | 11-120572 A | 4/1999 |
| JP | 2004-326887 A | 11/2004 |

* cited by examiner

*Primary Examiner* — Brian Miller
(74) *Attorney, Agent, or Firm* — Birch, Stewart, Kolasch & Birch, LLP.

(57) ABSTRACT

An optical-system driving device is achieved that can switch over between objective lenses and is space-saving, light-weight, and simply-configured. An optical-system driving device for recording information onto or playing it back from an optical storage medium, includes a stationary unit having a rotation axis; a movable unit pivotable about the rotation axis; pivotal movement means for pivotally moving the movable unit about the rotation axis; and the movable unit includes a holder having a plurality of optical means that is able to focus a beam of light onto the optical storage medium, and a plurality of conductive elastic members for supporting the holder, wherein an optical axis of each of the plurality of optical means is located substantially equidistant from the rotation axis, and the optical means for focusing the beam of light onto the optical storage medium is selected by pivotally moving the movable unit with the rotation means.

10 Claims, 21 Drawing Sheets

(a)

(b)

(a)

(b)

(a)

(b)

(a)

(b)

OPTICAL-SYSTEM DRIVING DEVICE EFFECTING SWITCHOVER BETWEEN OBJECTIVE LENSES FOR ACHIEVING FOCAL SPOTS

TECHNICAL FIELD

The present invention relates to optical-system driving devices for use in optical disk drives, such as DVD (digital versatile disk) recorders, for recoding information onto or playing back the same from optical storage media, more particularly to a configuration of the optical means and its driving mechanism.

BACKGROUND OF THE INVENTION

In optical disk drive-devices adapted to a plurality of kinds of optical disks, when a plurality of objective lenses are employed to achieve focus spots for the respective optical disks, there has been a need for switching over to an objective lens corresponding to each optical disk, with respect to the incident light beam.

To deal with this situation, there is disclosed a driving device that switches over between objective lenses by sliding along a straight guide-rail an overall objective lens driving device on which a plurality of objective lenses is mounted (for example, refer to Patent Document 1). In addition, there is disclosed another driving device that is provided with an objective lens switchover unit which arranges a plurality of kinds of objective lenses in a tracking direction, to fix to the lens holder, thereby shifting the lens holder in the tracking direction (for example, refer to Patent Document 2).

Patent Document 1: Japan Unexamined Patent Publication H11-120572 (pages 1 through 6; FIGS. 1 and 2).

Patent Document 2: Japan Unexamined Patent Publication H09-81947 (pages 1 through 8; FIGS. 1 through 6).

SUMMARY OF THE INVENTION

An objective lens driving device in Patent Document 1, however, translates along parallel guide-rails an overall objective lens driving device having a plurality of objective lenses. Thus, a problem has been that its movable unit is heavyweight, requiring a very large drive force; in addition there is a need for a large space to allow translation of the movable member and for a guide-rail support member and the like to be provided on a base, thus resulting in a space-consuming and complex device. In addition, switchover of the objective lens shown in Patent Document 2 varies coil and magnet positions in a tracking direction, in an objective lens driving mechanism; consequently, there has been a need for a large magnet in the tracking direction, thus causing an increase in size of the device and an increase in cost.

The present invention is directed to overcome these problems and an object is to provide an optical-system driving device enabling switchover between the objective lenses and having a compact, lightweight and simple configuration, in an optical-system driving device in which a plurality of lenses are held by a single lens holder (movable unit).

An optical-system driving device according to the present invention, for recording information onto and playing back the same from an optical storage medium, comprises a stationary unit having a rotation axis; a movable unit pivotable about the rotation axis; and pivotal movement means for pivotally moving the movable unit about the rotation axis; wherein the movable unit including a holder having a plurality of optical means that is capable of focusing a beam of light onto the optical storage medium, and a plurality of conductive elastic members for supporting the holder, an optical axis of each of the plurality of optical means is located substantially equidistant from the rotation axis, and by pivotally moving the movable unit with the rotation means, one of the optical means for focusing the beam of light onto the optical storage medium is selected.

In an optical-system driving device according to the present invention, because of the above-described configuration being adopted, advantageous effects are that a compact, lightweight and low-cost optical-system driving device can be provided in which switchover between the lenses is enabled.

BRIEF DESCRIPTION OF THE DRAWINGS

FIG. 9(*a*) is a front view and FIG. 9(*b*) is a top view, of the optical-system driving device; and FIG. 9 (*c*) is a side view of the optical-system driving device;

EXPLANATION OF REFERENCE CHARACTERS

Figure 1:
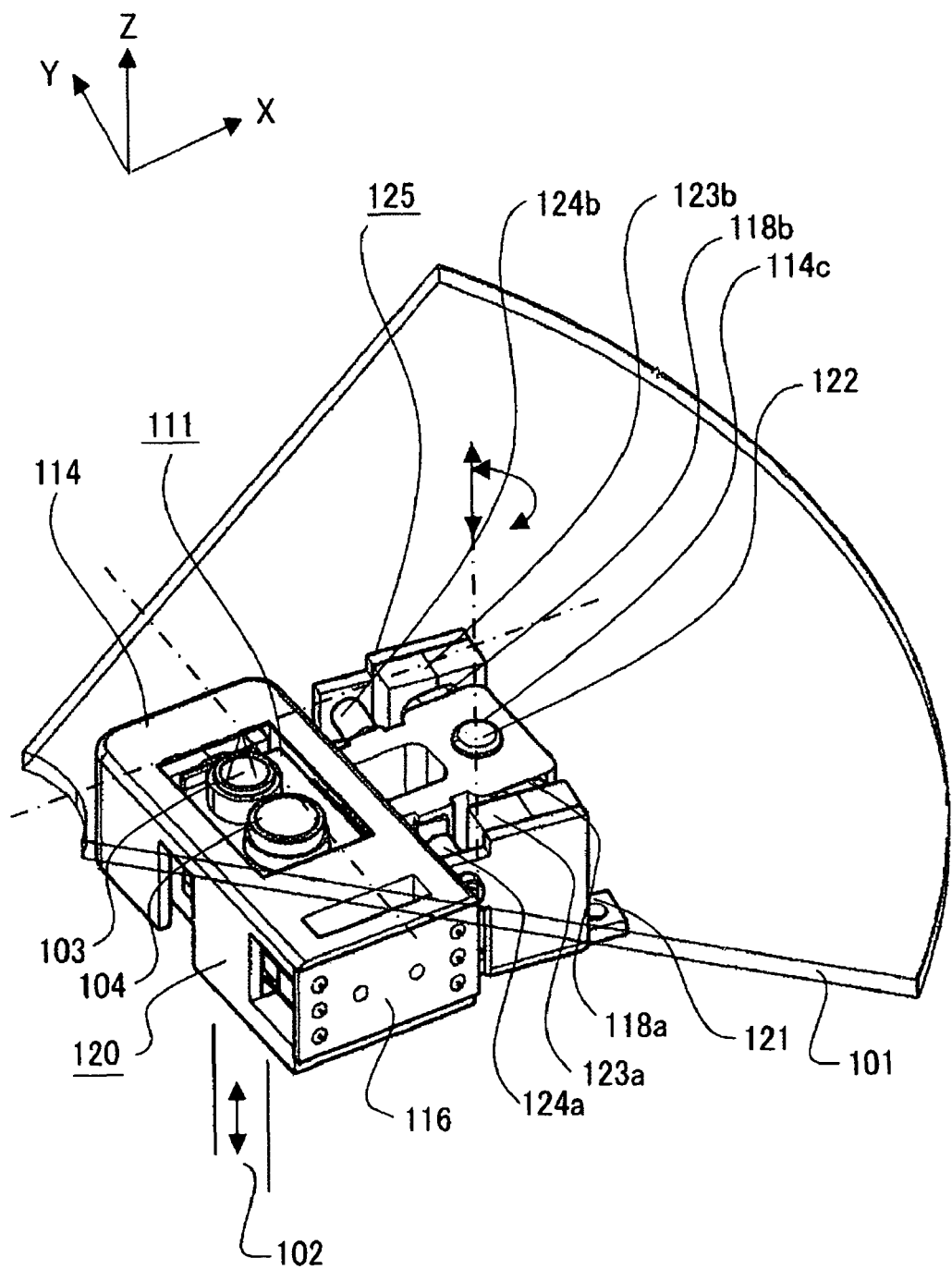
FIG. 1 is a perspective view illustrating an optical-system driving device in a state where a first optical means is selected, in Embodiment 1.

101: optical disk
102: beam of light
103: objective lens
104: objective lens
105: lens holder
106*a* through 106*d*: focus coils
107*a* through 107*d*: tracking coils
108*a* and 108*b*: tilt coils
109*a* and 109*b*: power-supplying substrates
110*a* and 110*b*: balancers
111: lens holder unit
112*a* and 112*b*: permanent magnets
113*a* and 113*b*: back yokes
114: base holder
114*a* and 114*b*: recesses
114*c*: shaft bearing opening
114*d*: bottom surface
114*e* and 114*f*: protrusions
115*a* through 115*f*: elastic members
116: fixing plate
117*a* and 117*b*: damper substances
118*a* and 118*b*: coils for pivotal movement
119*a* and 119*b*: magnetic pieces
120: objective lens drive unit
121: base
121*a* and 121*b*: bosses
122: shaft
123*a* and 123*b*: magnets for pivotal movement
124*a* and 124*b*: adjust screws
125: stationary unit
131: base
131*a*: first wall
131*b*: second wall
131*c*: third wall
132: shaft
133*a* and 133*b*: magnets
134: magnet
135*a* and 135*b*: magnetic members
136: objective lens
137: objective lens
138: lens holder
139*a* through 139*d*: focus coils
140*a* through 140*d*: tracking coils
141*a* and 141*b*: tilt coils
142*a* and 142*b*: conductive elastic members
143*a* and 143*b*: conductive elastic members
144*a* and 144*b*: magnetic pieces
145: support holder
146: switchover coil
147: balancer
148: power supply means

BEST MODE FOR CARRYING OUT THE INVENTION

Embodiment 1

Figure 2:
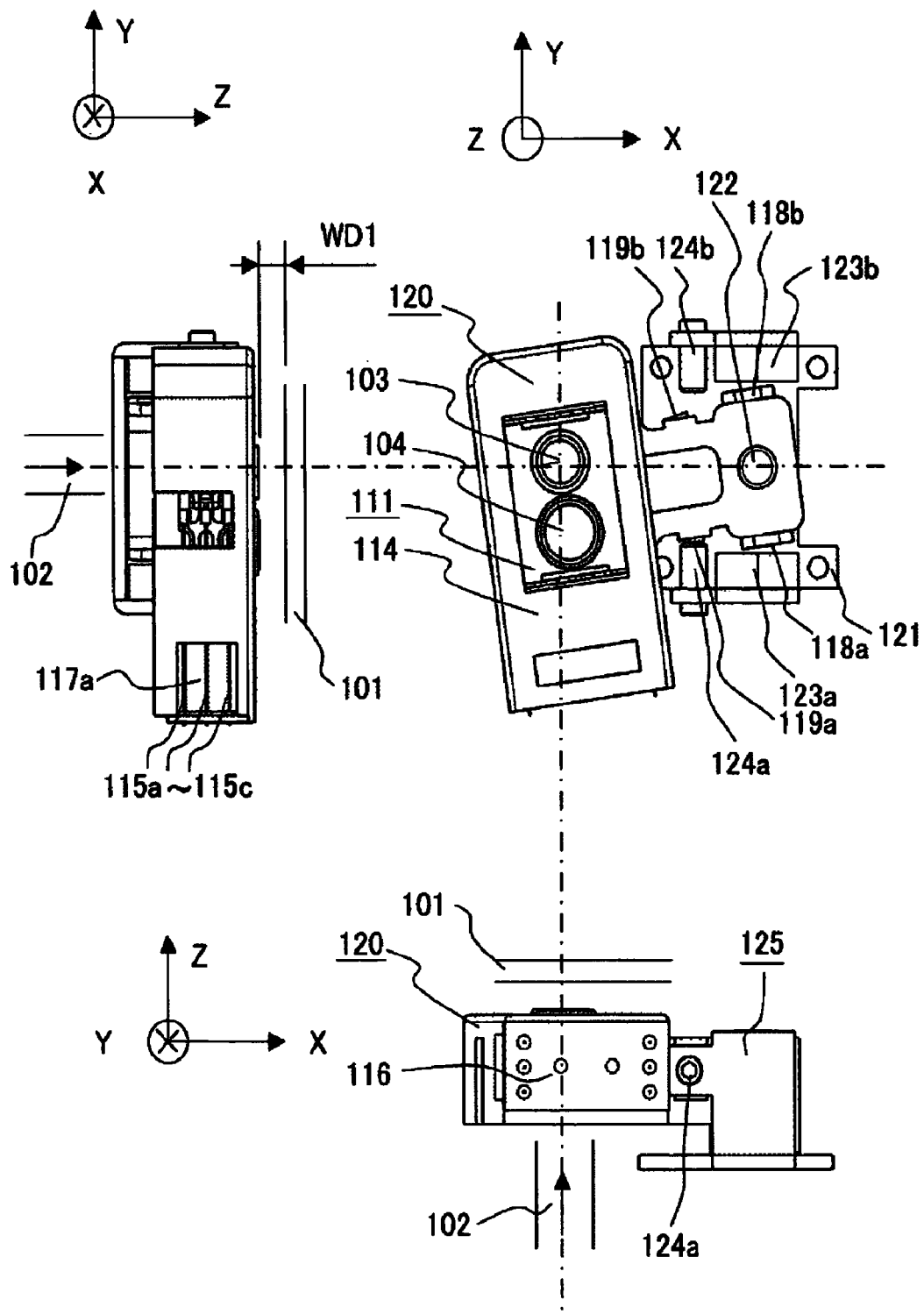
FIG. 2 illustrates three plan views of the optical-system driving device in FIG. 1.
Figure 3:
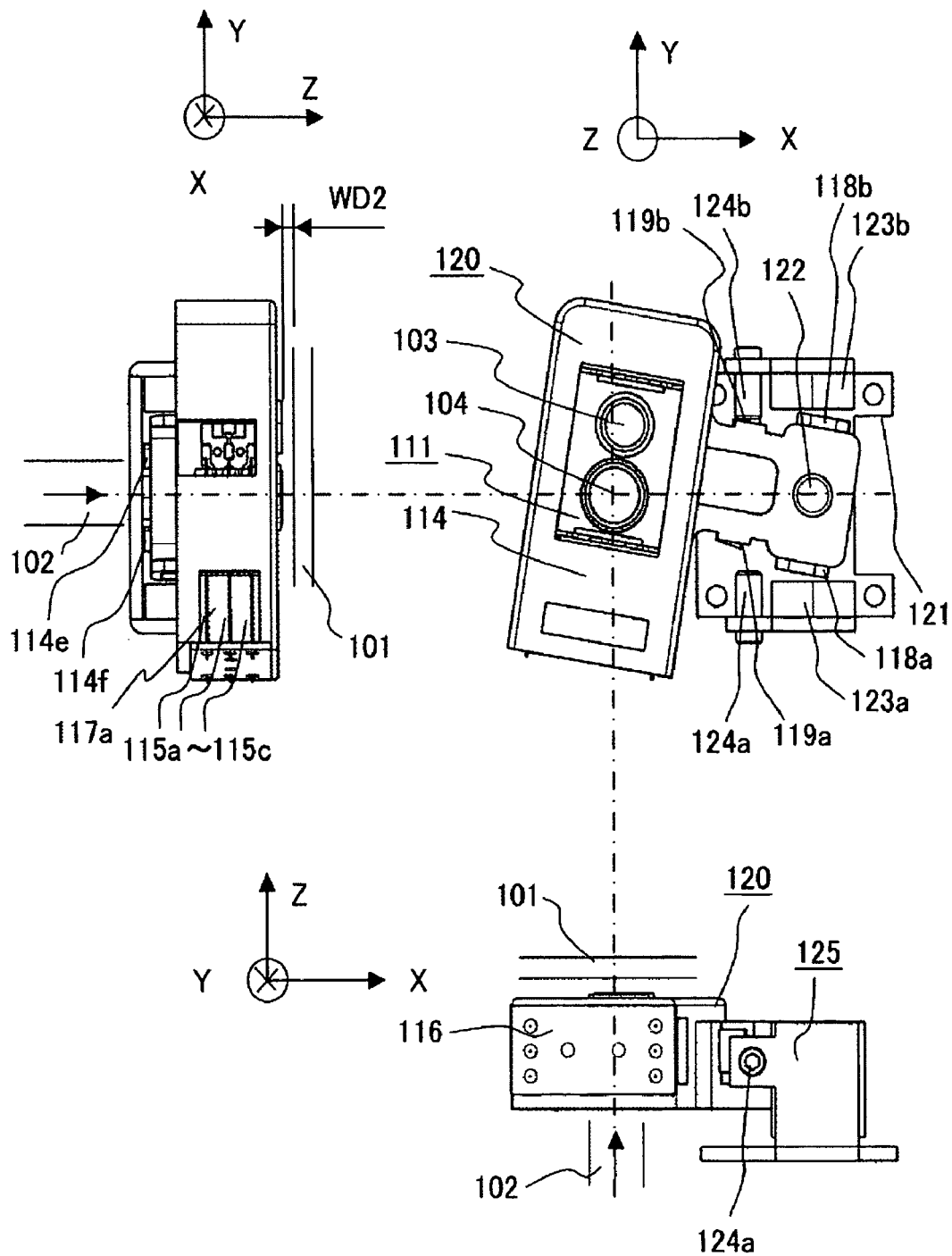
FIG. 3 illustrates three plan views illustrating an optical-system driving device in a state where a second optical means is selected, in Embodiment 1.
Figure 4:
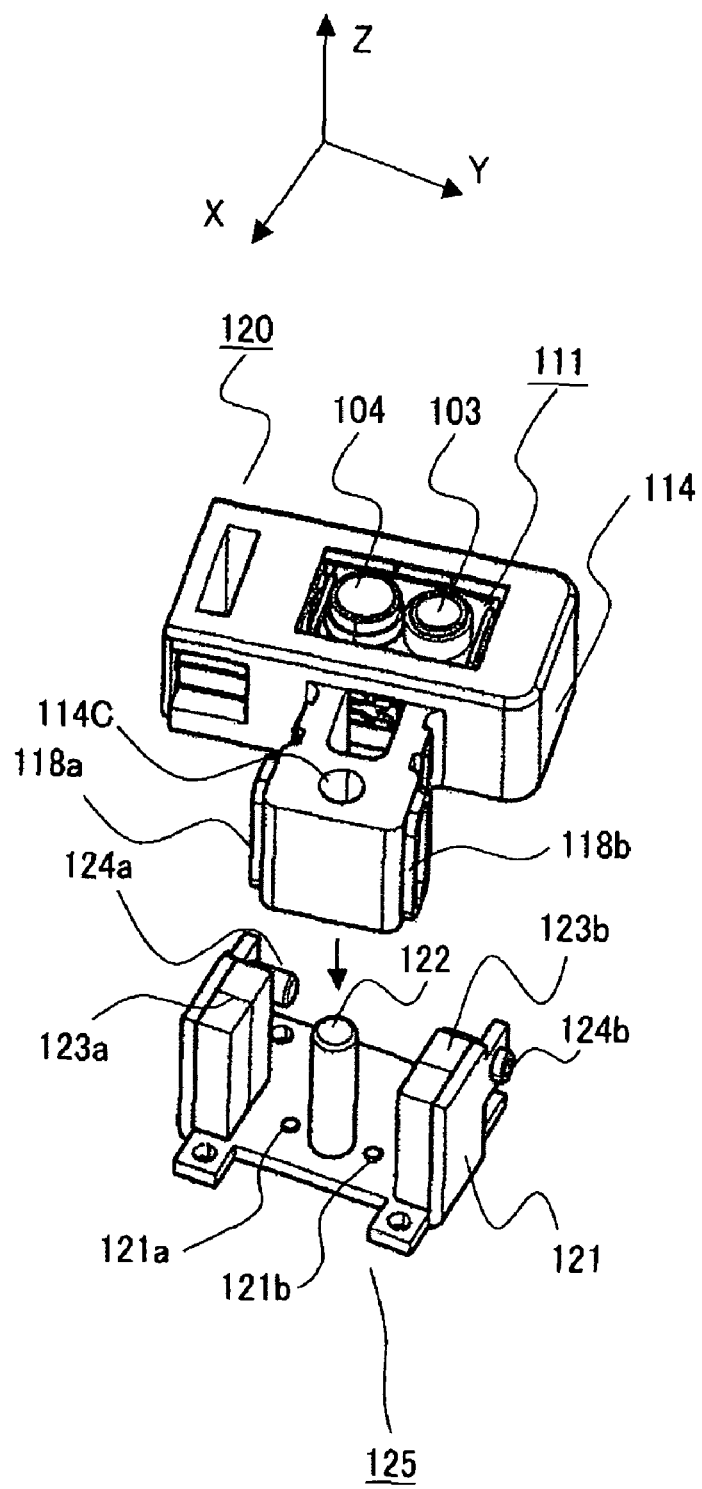
FIG. 4 is an exploded perspective view separately indicating an objective lens drive unit and a stationary unit of the optical-system driving device, in Embodiment 1.
Figure 5:
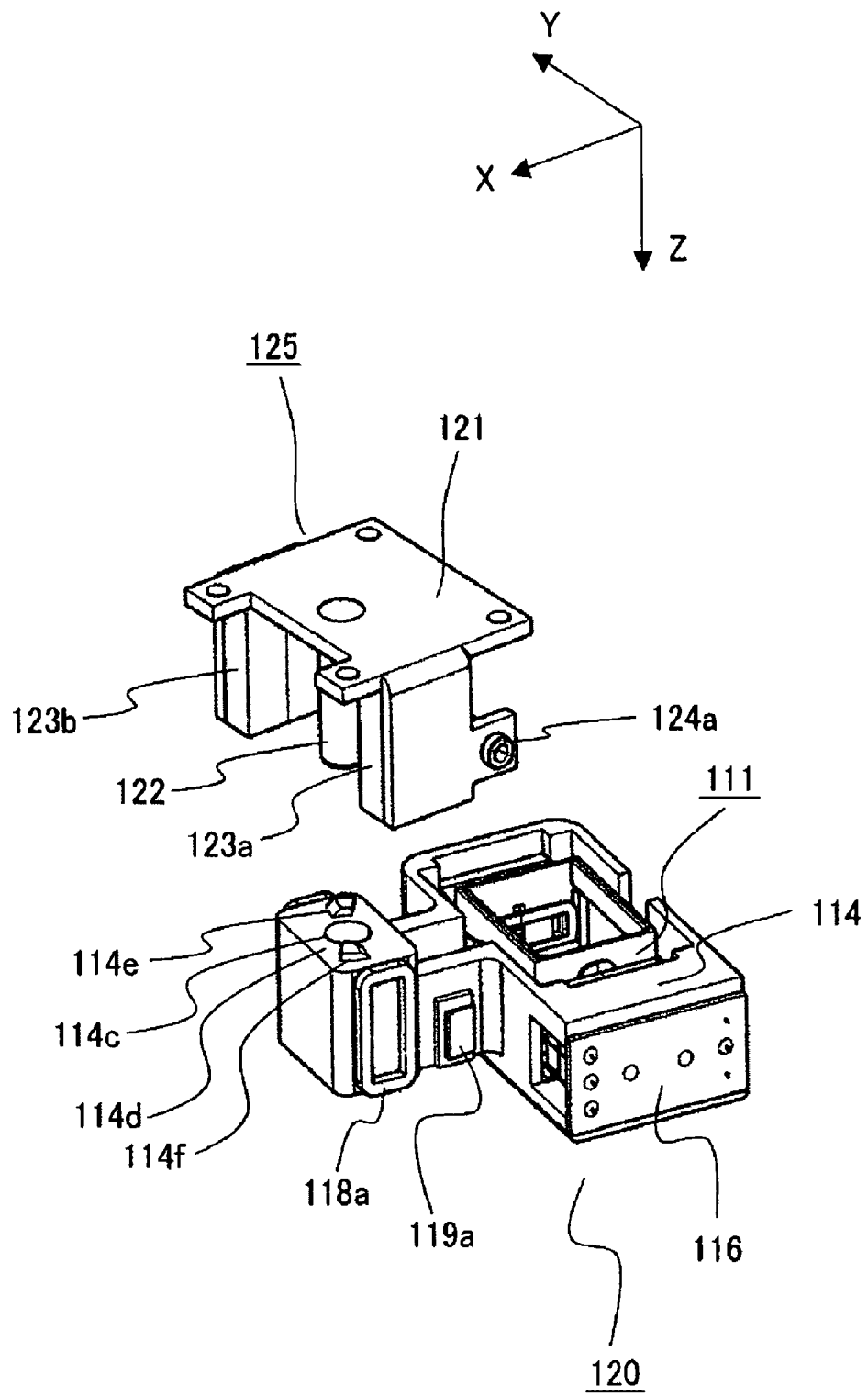
FIG. 5 is an exploded perspective view of the units in FIG. 4, as viewed from a different perspective.
Figure 6:
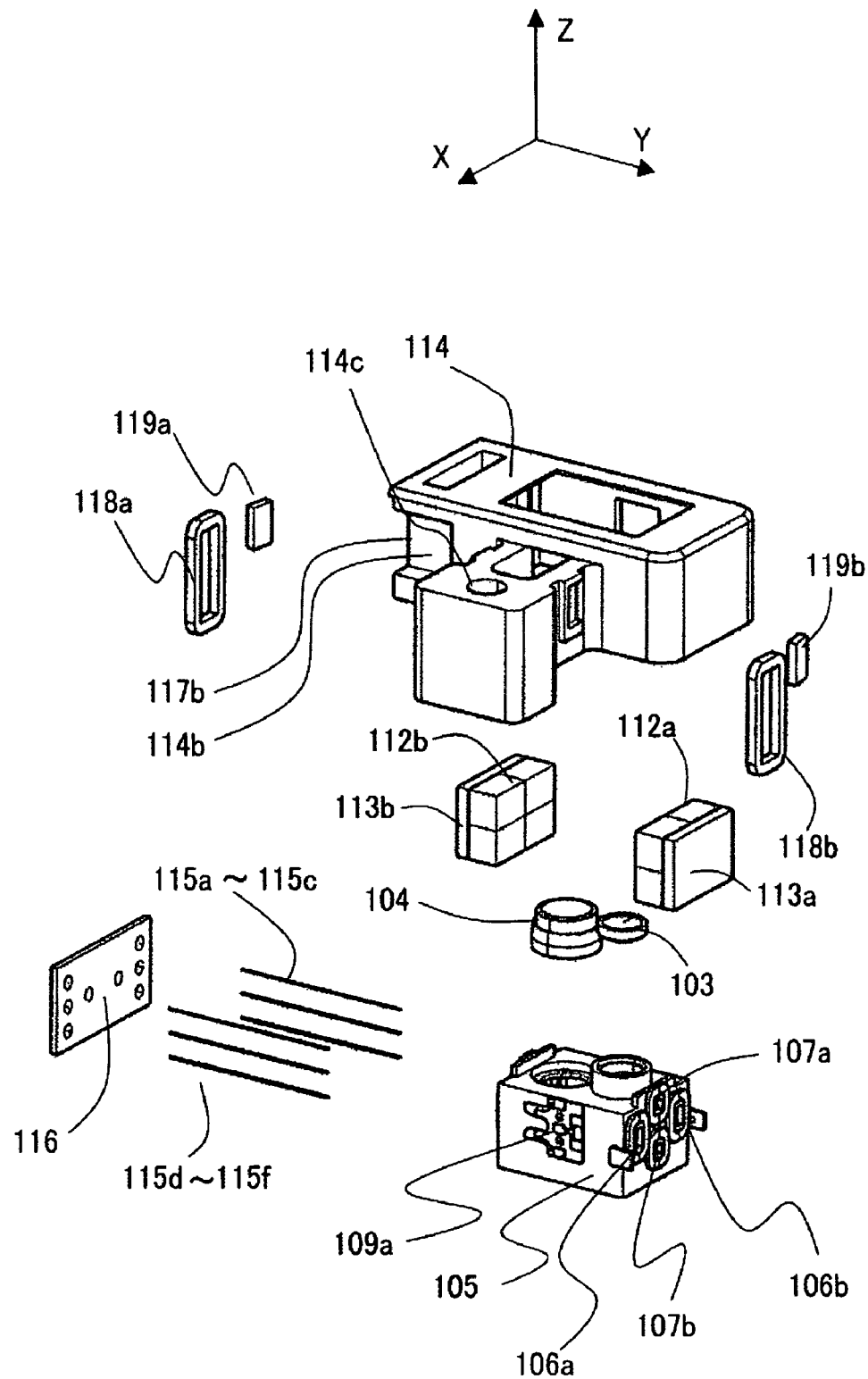
FIG. 6 is an exploded perspective view illustrating the objective lens drive unit in Embodiment 1.
Figure 7:
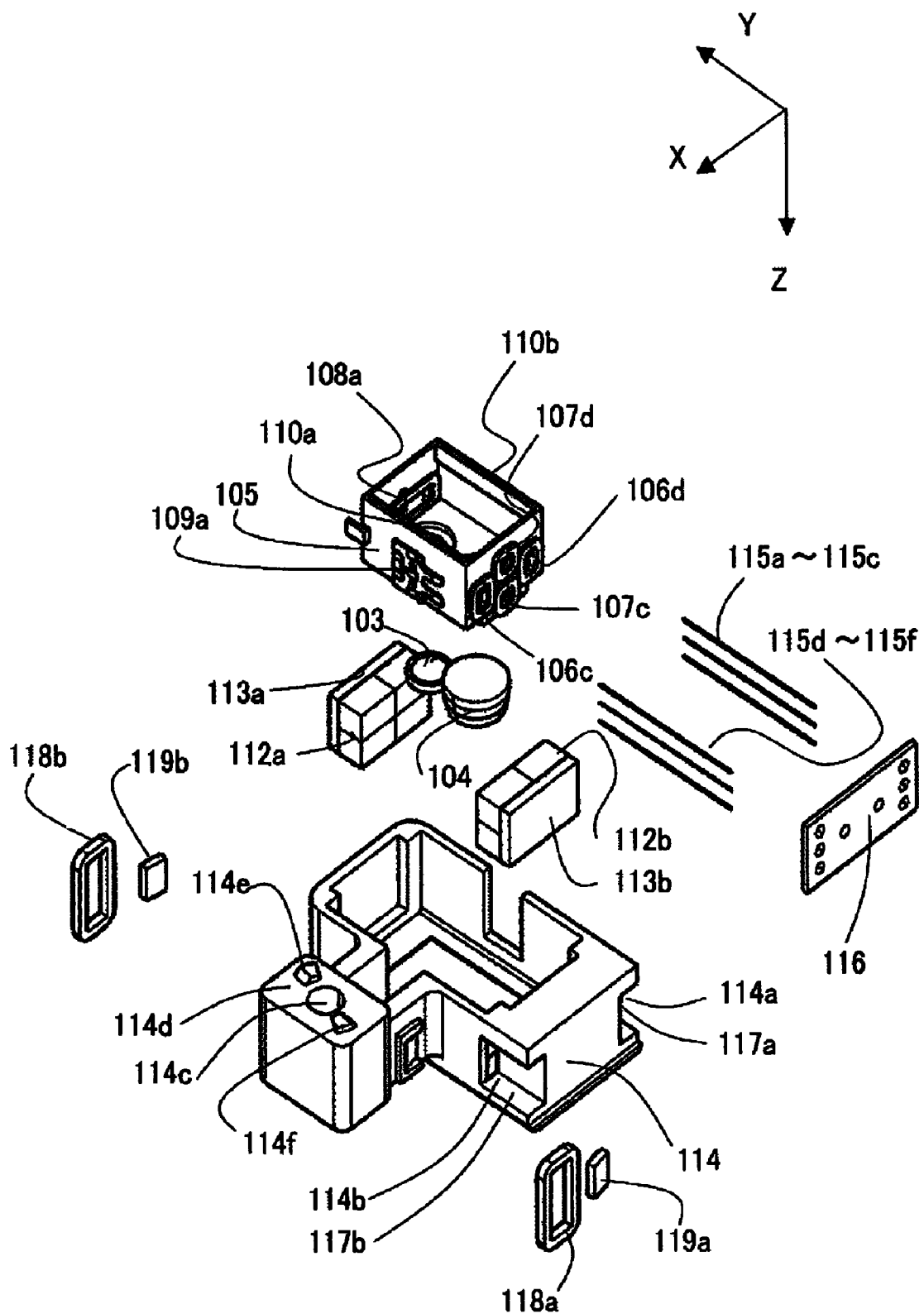
FIG. 7 is an exploded perspective view of the unit in FIG. 6, as viewed from a different perspective.

FIG. 1 is a perspective view illustrating an optical-system driving device in a state where a first optical means is selected, in Embodiment 1 of the present invention; FIG. 2 illustrates three plan views of the optical-system driving device in FIG. 1; FIG. 3 illustrates three plan views illustrating an optical-system driving device in a state where a second optical means is selected, in Embodiment 1; FIG. 4 is a perspective view separately indicating an objective lens drive unit and a stationary unit of the optical-system driving device, in Embodiment 1; FIG. 5 is an exploded perspective view of the units in FIG. 4 as viewed from a different perspective; FIG. 6 is an exploded view illustrating the objective lens drive unit of the optical-system driving device, in Embodiment 1; and FIG. 7 is an exploded perspective view of the unit in FIG. 6 as viewed from a different perspective. An optical-system driving device according to the present invention constitutes an optical disk drive. In the figures, however, each portion of the optical disk drive other than the optical-system driving device is omitted. In addition, in XYZ coordinate axes shown in each of the figures, the Z-axis is oriented in parallel with an optical axis of the objective lens; the X-axis is oriented perpendicular to the Z-axis and in the direction of a radius of a disk recording medium; the Y-axis is oriented in the direction mutually perpendicular to both of the foregoing axes.

Embodiment 1 of the present invention will be described hereinafter with reference to FIGS. 1 through 7. Referring to FIGS. 1 through 7, an optical disk, indicated at numeral 101, is an optical information recording medium; a beam of light, indicated at numeral 102, is emitted from a semiconductor laser or the like which constitutes an unillustrated optical system. Objective lenses, indicated at numerals 103 and 104, are optical means that focus a beam of light 102 on an optical disk 101, which lenses are, e.g., for HD-DVDs and BDs (blue ray disks) application; profiles and specifications such as a reference working distance from the front side of the optical disk 101 differ mutually. Optical axes of objective lenses 103 and 104 are aligned substantially in a direction of the Y-axis, and fixed onto a lens holder 105 so that the top face of each lens may keep the same height. The lens holder 105 is formed of a plastic material of lightweight and high stiffness, such as a liquid polymer; the holder is of the shape having a surface on which the objective lenses 103 and 104 are mounted, and four thin lateral walls; a quartet of flattened focus coils 106*a* through 106*d* and tracking coils 107*a* through 107*d* are adhesively fixed on a pair of mutually opposing outer surfaces of the sidewall so that each two of the focus coils and the tracking coils may not overlap with each other. In addition, a pair of flattened tilt coils 108*a* and 108*b* (not shown) is adhesively bonded one by one on the inner side of surfaces on which the focus coils 106*a* through 106*d* and the tracking coils 107*a* through 107*d* of the lens holder 105 are adhesively fixed. Moreover, fixed on the other pair of mutually opposing outer lateral surfaces of the lens holder 105 are power-supplying substrates 109*a* and 109*b* (not shown) and on the inner lateral surfaces, brass balancers 110*a* and 110*b* for obtaining dynamic balance, which constitutes a lens holder unit 111.

Permanent magnets, indicated at 112*a* and 112*b*, to which back yokes 113*a* and 113*b* are attached, are magnetized in four-pole configuration and divided in the middle thereof lengthwise and transversely; the permanent magnets are fixed onto a base holder 114, formed of a plastic material of lightweight and high stiffness such as a liquid polymer, so that their magnets may be disposed, with a spacing distance, facing the focus coils 106a through 106d, the tracking coils 107a through 107d, and the tilt coils 108a through 108d. Next, first ends of a pair of groups of conductive elastic members—each group constituted of three elastic members (115a through 115c or 115d through 115f) arranged in a parallel row—are fixed by soldering to the power-supplying substrates 109a and 109b that constitute the lens holder unit 111; the elastic members are electrically and independently connected, on a pair-by-pair basis, to the focus coils 106a through 106d, the tracking coils 107a through 107d, and the tilt coils 108a and 108b. Second ends of the elastic members 115a through 115f are fixed by soldering to a fixing plate 116 fixed to the base holder 114; the lens holder unit 111 is elastically supported by these elastic members 115a through 115f with respect to the base holder 114. Furthermore, the fixing plate 116 of the base holder 114 is formed with recesses 114a and 114b; damper substances 117a and 117b—an ultraviolet cure gel—is applied to the recesses 114a and 114b so as to envelop the vicinities of end portions of the elastic members 115a through 115f. Moreover, the base holder 114 is integrally formed, at two places of bottom surface 114d thereof, with protrusions 114e and 114f—sloped in the direction of rotation about the axis of a shaft bearing opening 114c—and the shaft bearing opening 114c—in parallel with the optical axes of the objective lenses 103 and 104—at a place equidistant from the optical axes of the objective lenses 103 and 104, and distant therefrom in a direction of the X-axis. In addition, a pair of rectangular coils for pivotal movement 118a and 118b, and magnetic pieces 119a and 119b are fixed to a portion in the proximity of the shaft bearing opening 114c of the base holder 114; the foregoing components constitute an objective lens drive unit 120.

A base, indicated at 121, is made by pressing a magnetic material such as a cold rolled steel; a shaft 122 is erected on the bottom surface thereof; two bosses 121a and 121b are provided in the vicinity thereof. In addition, fixed on the lateral sides of the base 121 is a pair of permanent magnets for pivotal movement 123a and 123b magnetized in a two-pole configuration; a pair of adjust screws 124a and 124b made of a magnetic material is disposed in the vicinities of the magnets; the foregoing components constitute a stationary unit 125.

Next, the shaft 122 constituting the stationary unit 125 is inserted and fitted into the shaft bearing opening 114c of the base holder 114, constituting the objective lens drive unit 120, whereby the objective lens drive unit 120 is slidably supported pivotally about the shaft 122 of the stationary unit 125. In addition, at this time, the magnets for pivotal movement 123a and 123b are disposed so as to be opposite, with a spacing distance, the coils for pivotal movement 118a and 118b; the adjust screws 124a and 124b, to be opposite the magnet pieces 119a and 119b; and the bosses 121a and 121b of the base 121, to abut on a bottom surface 114d or the protrusions 114e and 114f of the base holder 114.

Next, operations will be described below. FIG. 2 is a view illustrating a positional relationship between the stationary unit 125 and the objective lens drive unit 120 with the objective lens 103 being selected. Referring to FIG. 2, the objective lens drive unit 120 rotates about the shaft 122 counterclockwise around the Z-axis; the magnetic piece 119a on the objective lens drive unit 120 is stationary with the magnetic piece 119a abutting on the extremity of the adjust screw 124a provided on the stationary unit 125. At this moment, the adjust screw 124a is magnetized, via the base 121 of the magnetic material, by magnetic force of the magnet for pivotal movement 123a, which thus attracts the magnetic piece 119a to make it stationary. In assembling such components, by adjusting the adjust screw 124a, the optical axis of the objective lens 103 is aligned so as to coincide with the center of the beam of light 102. Furthermore, the bosses 121a and 121b formed on the base 121 is to abut on the bottom surface 114d by going around the protrusions 114e and 114f formed on the base holder 114; thus, the position of the objective lens drive unit 120 in a direction of the Z-axis is defined relative to the stationary unit 125; a distance between the optical disk 101 and the objective lens 103 is established so as to coincide with the working distance (WD1). As the foregoing, the objective lens 103 is disposed in a position where the optical axis thereof coincides with the center of the beam of light 102, and the distance between the objective lens 103 and the optical disk 101 substantially coincides with the working distance (WD1).

Under the above-described situation, displacement in the direction of the focal point of the focus spot formed on the optical disk 101 using the objective lens 103 is sensed with a focus sensor—based on the known anastigmatic method or the like—provided on an unillustrated optical head; The focus coils 106a through 106d are energized via two out of the elastic members 115a through 115f by a current according to the focus displacement, whereby the lens holder 105 is moved in the direction of the optical axis of the objective lens 103 (the Z-axis direction) by the electromagnetic interaction between the focus coils and the permanent magnets 112a and 112b, thus effecting focus control. In addition, focus spot displacement in the tracking direction of a desired track is sensed with a tracking sensor—based on the known differential push-pull method or the like—provided on the unillustrated optical head; The tracking coils 107a through 107d are energized via two out of the elastic members 115a through 115f by a current according to the tracking displacement, whereby the lens holder 105 is moved in the tracking direction orthogonal to the optical axis of the objective lens 103 by the electromagnetic interaction between the focus coils and the permanent magnets 112a and 112b, thus effecting tracking control. At this moment, with respect to the radial direction of the optical disk 101 (the X-axis direction), the objective lens 103 is slightly tilted and shifted according to the amount of rotation of the objective lens drive unit 120, which however will not pose a problem because of a very small amount of tilt.

In addition, a relative tilt between the optical disk 101 and the objective lens 103 is sensed; the tilt coils 108a and 108b are energized via two out of the elastic members 115a through 115f by a current according to the amount of tilt, whereby by electromagnetic interaction between the permanent magnets 112a and 112b and the tilt coils, the lens holder 105 is tilted around an axis orthogonal to the focus direction and the tracking direction, thereby performing tilt control.

Furthermore, the lens holder unit 111 is elastically supported by six elastic members 115a through 115f; thus when the focus coils 106a through 106d are deenergized, the holder unit is returned to its reference position in the focus direction; when the tracking coils 107a through 107d are deenergized, the holder unit is returned to its reference position in the tracking direction; and when the tilt coils 108a through 108d are deenergized, the holder unit is returned to its reference position in the tilt direction. Moreover, the damper substances 117a and 117b are filled so as to envelop portions of six elastic members 115a through 115f in the vicinity of the fixing plate 116, thus imparting damping to the lens holder unit 111; as a result, favorable focus control, tracking control and tilt control characteristics are achieved, and also unwanted vibration from outside is hard to be transmitted to the lens holder unit 111.

FIG. 3 is a view illustrating a positional relationship between the stationary unit 125 and the objective lens drive unit 120 in a state where the objective lens 104 is selected. A method will be described in which switchover is made from the state where the objective lens 103 is selected as shown in FIG. 2, to the state where the objective lens 104 is selected as shown in FIG. 3. In the state shown in FIG. 2, magnetic attraction acting between the magnetic piece 119a and the adjust screw 124a fixes the objective lens drive unit 120 to the stationary unit 125. In this situation, when a current is supplied to the coils for pivotal movement 118a and 118b so that a clockwise force may be generated about the shaft 122, electromagnetic interaction between the coils and the magnets for pivotal movement 123a and 123b produces coupling force. If the produced force exceeds the magnetic attraction between the magnetic piece 119a and the adjust screw 124a, then the objective lens drive unit 120 is released from its stationary state, to thereby rotate clockwise about the shaft 122. Furthermore, sides in the direction of the Z-axis in which the rotation force by the coils for pivotal movement 118a and 118b is produced, are disposed so as to be constantly opposite, in the rotation range, predetermined magnetic poles of the magnets for pivotal movement 123a and 123b; thus, regardless of rotation positions, the rotation force can be produced constantly in the specific direction, according to the direction of current flow. In this way, the objective lens drive unit 120 is driven clockwise; a distance between the magnetic piece 119b and the adjust screw 124b is reduced; then, the magnetic attraction is exerted on the magnetic 119b and the adjust screw 124b, thereby fixing the stationary unit 125 to the objective lens drive unit 120. In assembling such components, by adjusting the adjust screw 124b, the optical axis of the objective lens 104 is aligned so as to coincide with the center of the beam of light 102. In addition, by the rotation, the bosses 121a and 121b formed in the base 121 run on the protrusions 114e and 114f to abut on the protrusions 114e and 114f; thus, a Z-axis directional position of the objective lens drive unit 120 is also displaced with respect to the stationary unit 125, whereby a distance between the optical disk 101 and the objective lens 104 is established at a positional point coinciding with the working distance (WD2) of the objective lens 104. As the foregoing, the objective lens 104 is made stationary in a position where the optical axis thereof coincides with the center of the beam of light 102 and the distance between the objective lens and the optical disk substantially coincides with the working distance (WD2).

In a state in which the objective lens 104 is selected as well, the focus, tracking, and tilt controls are performed, as with the state in which the objective 103 is selected.

As described thus far, switchover between the objective lenses 103 and 104 is made, which resultantly causes no changes in reference positions between the permanent magnets and the coils—i.e., the focus coils 106a through 106d, the tracking coils 107a through 107d, the tilt coils 108a and 108b, and the permanent magnets 112a and 112b; thus, regardless of which objective lens is being selected, there is no changes made in the drive characteristics, which causes no changes in a positional relationship between the center of gravity of the lens holder unit 111 and the drive force. In addition, the objective lenses 103 and 104 each maintain the same level at their top surfaces; thus, detrimental effects can be avoided such that as with the case where there exists a height difference between their top surfaces, when one objective lens far from the optical disk is used, the other closer to the optical disk will collide with the disk, or there will be a restriction to the movable range.

When the switchover is made from the selected objective lens 104 to the objective lens 103, the coils for pivotal movement 118a and 118b are energized by a current so that a counterclockwise force may be produced about the shaft 122, whereby the switchover is to be effected on the same principle.

In the present embodiment, two objective lenses have been arranged substantially in the direction of the Y-axis; however, as long as the objective lenses each are located equidistantly from the rotation axis, they may be arranged in any direction, and also three or more objective lenses may be provided. However, in order to downsize the overall optical disk drive, preferably, a spindle motor (not shown) for rotating the optical disk 101 is provided on the side of the optical-system driving device, relative to the optical disk 101; in this case, a plurality of objective lenses are arranged substantially in the direction of the Y-axis, and the rotation axis of the objective lens drive unit 120 is located on the opposite side of the spindle axis with respect to the objective lens, thereby enabling the spindle motor and the optical-system driving device to be compactly placed in a small space.

Furthermore, as for the pivotal movement in the objective drive unit 120, the objective lenses are switched and made stationary by electromagnetic force and magnetic attraction exerted by the coils, magnets and magnetic plates; another drive means including an electric magnet or a stepping motor enables basically the same operations as well.

In addition, the optical-system driving device is rotated around an axis equidistant from the optical axes of a plurality of objective lenses, to thereby select one out of them; as a result, the small drive force enables the switchover between them and also an optical-system driving device that is miniature, lightweight and simply-configured can be provided.

Furthermore, since pivotal movement of the optical-system driving device causes the optical-system driving device to be displaced in the axis direction, a heightwise position of each objective lens in the optical axis direction can be arbitrarily selected. Moreover, advantageous effects are that in the reference position in the focus direction, the switchover between the objective lenses will not create positional displacement between the focus coils and the tracking coils, and the permanent magnets.

In addition, since a plurality of objective lenses is disposed so that their top surface levels are equal to each other, drawbacks created due to a collision between the optical disk and the objective lens, limitations of the movable amount and the like, can be avoided, thus ensuring an operational distance needed for each objective lens.

Another advantageous effect is that since the rotation axis for the switchover is located substantially in the tracking direction, a dimension from the objective lens to the inner radius side of the optical disk can be reduced. This arrangement enables the optical-system driving device and the components, such as a spindle motor, to be arranged compactly, thus resulting in reduction in overall size of the optical disk drive.

Still another advantageous effect is that forming a shaft bearing opening on a base holder made of a resin material reduces a disk drive weight and a component count.

Still another advantageous effect is that a rotation means, a rotation-amount-limiting means, and a lock means are obtained with a simple and low-cost configuration because the objective lens drive unit 120 is rotated by electromagnetic drive force created using the permanent magnets for pivotal movement 123a and 123b and coils 118a and 118b, and moreover, a static magnetic force to be generated from the permanent magnets for pivotal movement 123a and 123b has been used as the lock means for locking the rotation.

Still another advantageous effect is that the center of the beam of light and an optical axis of each optical means can accurately be aligned by providing an adjustment mechanism for the limiting means that limits the rotation of the objective drive unit 120.

Yet another advantageous effect is that by providing the tilt drive means such as the tilt coils 108a and 108b, tilt control can be performed that cancels a tilt created due to warping, wobbling or the like of an optical storage medium.

Embodiment 2

Figure 8:
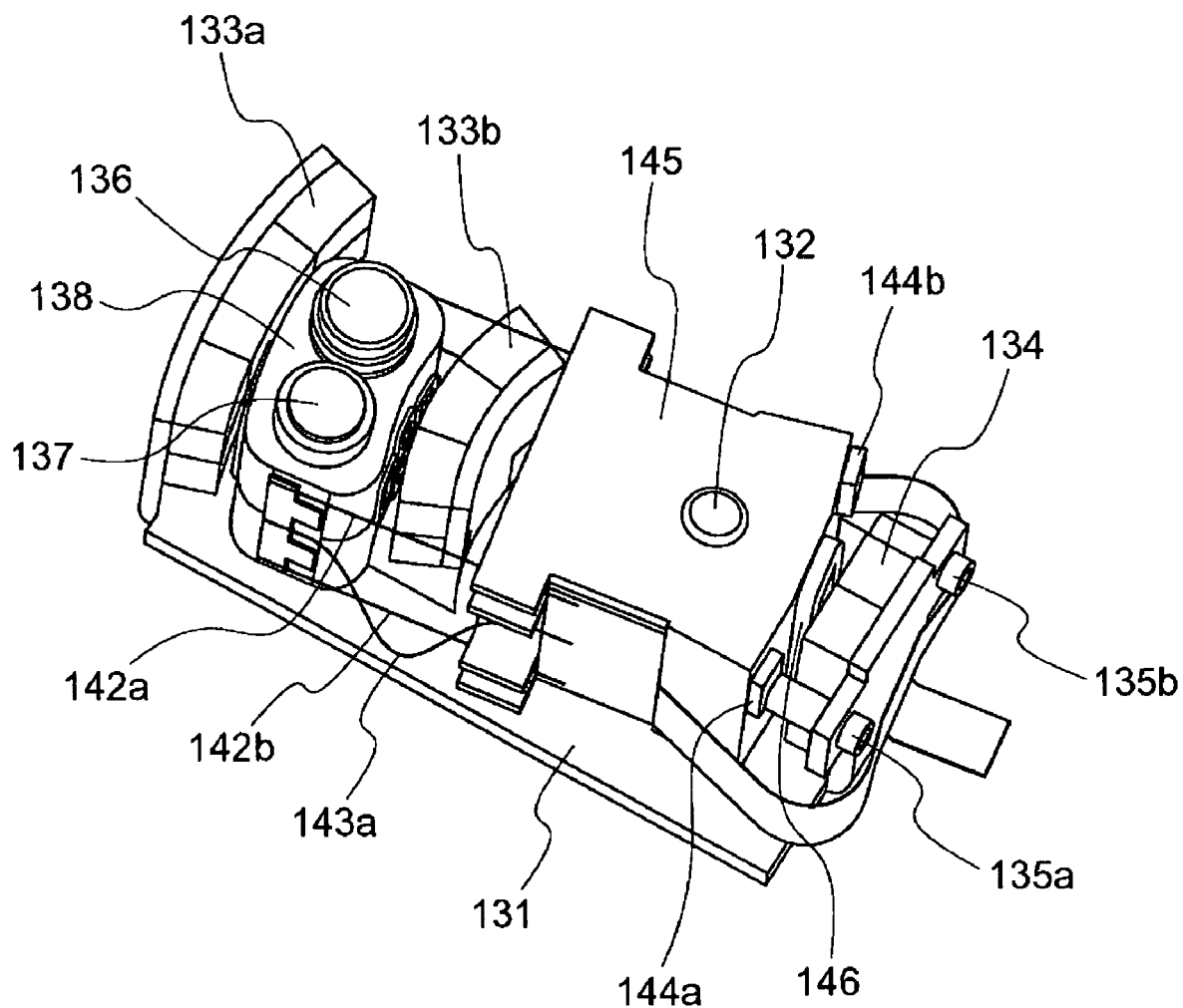
FIG. 8 is a perspective view illustrating an optical-system driving device in a state where a first optical means is selected, in Embodiment 2.
Figure 9:
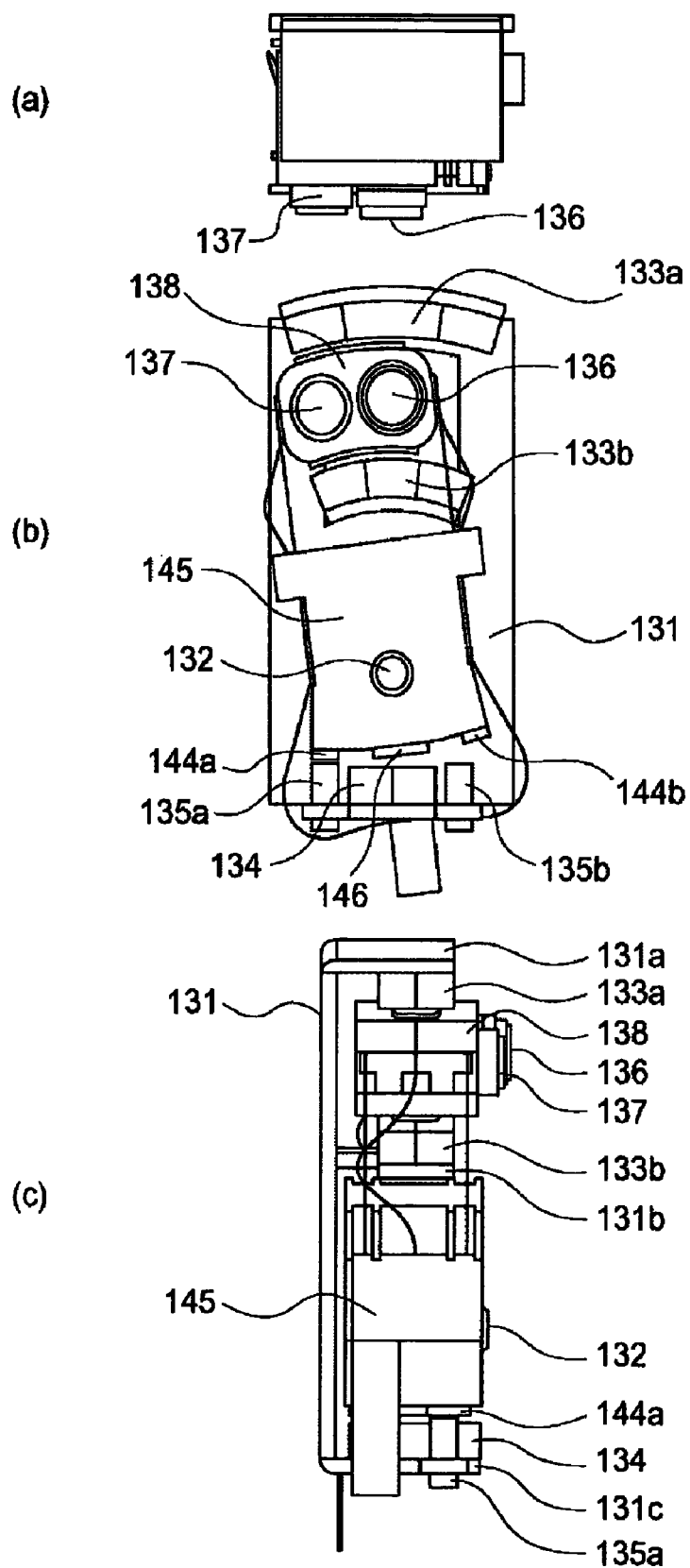
FIG. 9 illustrates three plan views of the optical-system driving device in FIG. 8.
Figure 10:
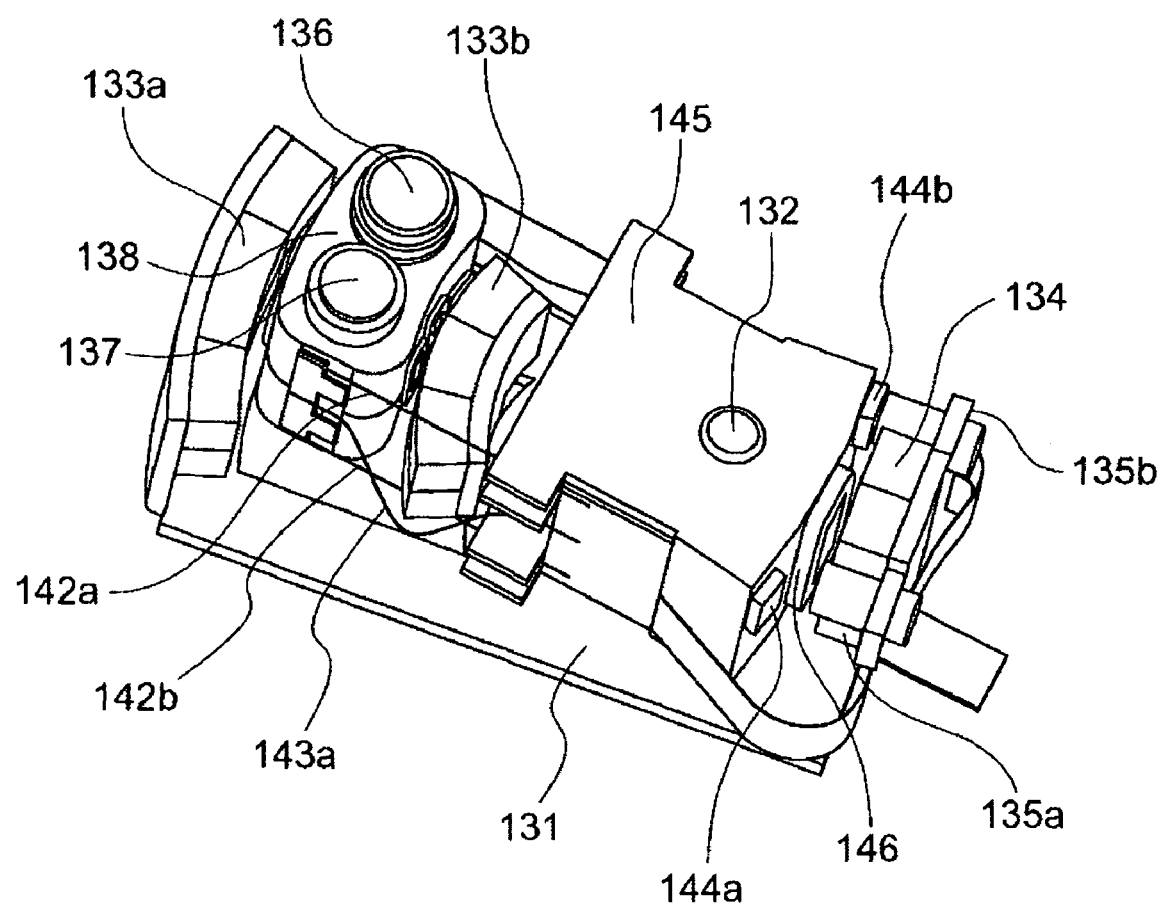
FIG. 10 is a perspective view illustrating an optical-system driving device in a state where a second optical means is selected, in Embodiment 2.
Figure 11:
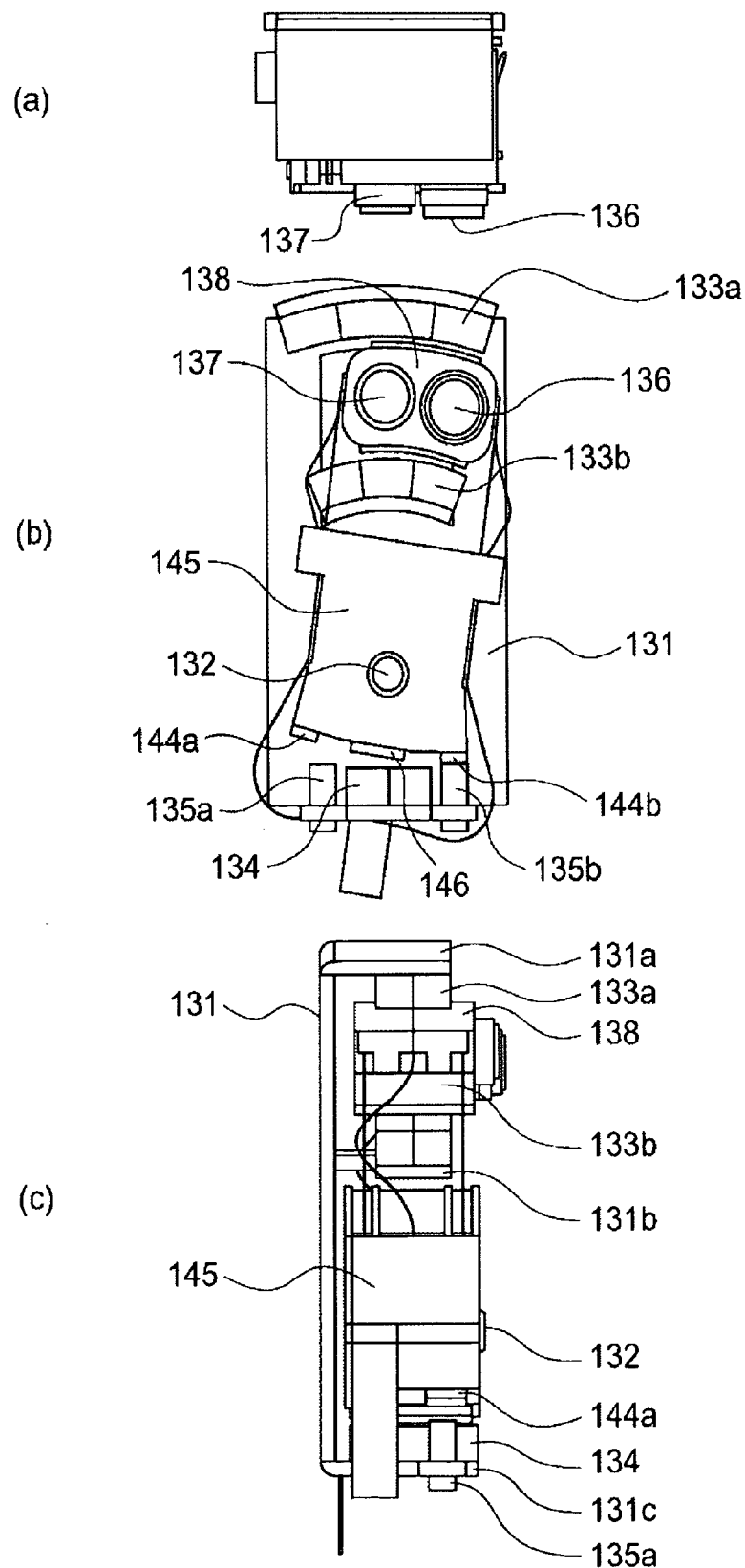
FIG. 11 illustrates three plan views of the optical-system driving device in FIG. 10.
Figure 12:
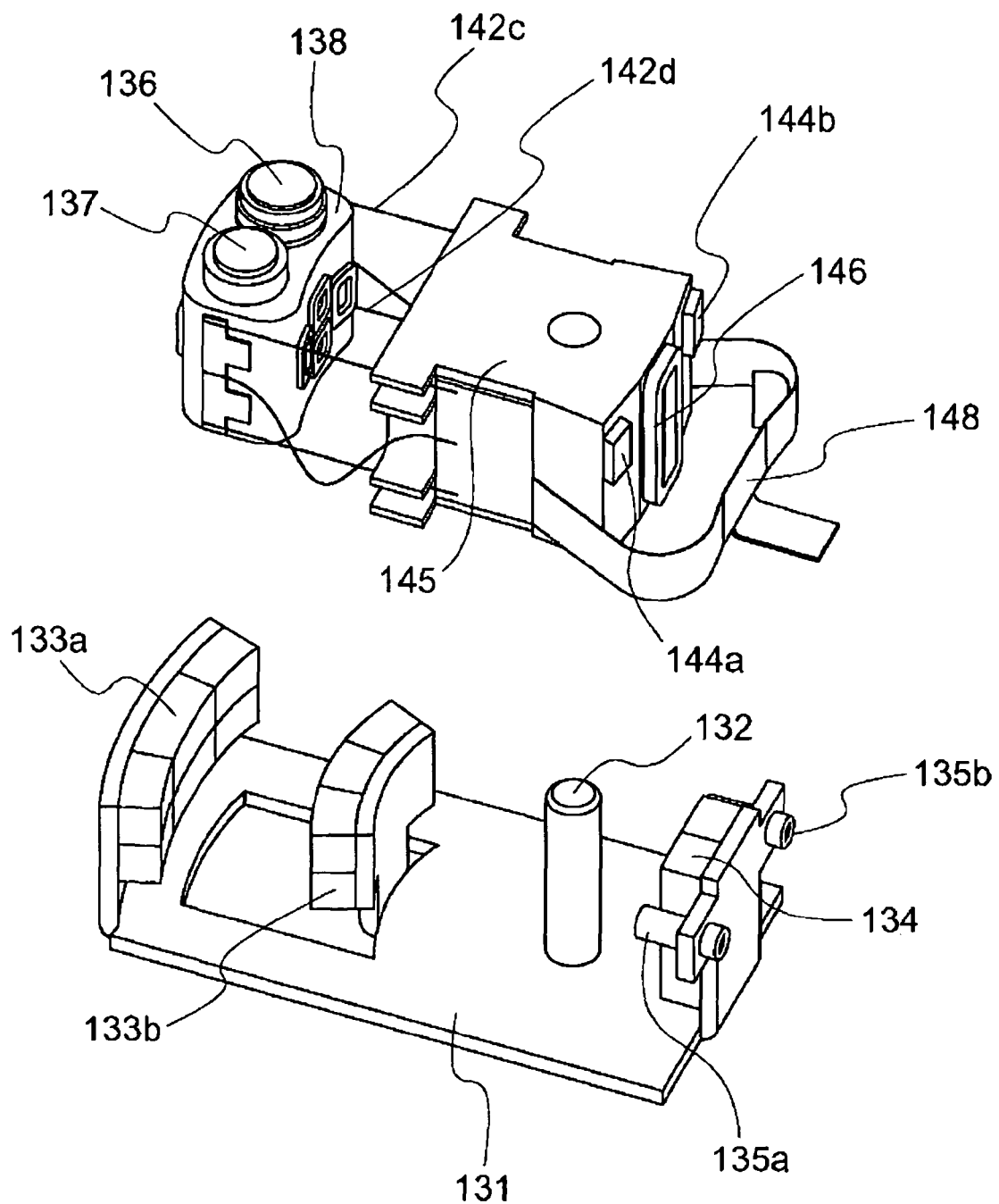
FIG. 12 is a general perspective view separately indicating the movable and stationary portions of the optical-system driving device in Embodiment 2.
Figure 13:
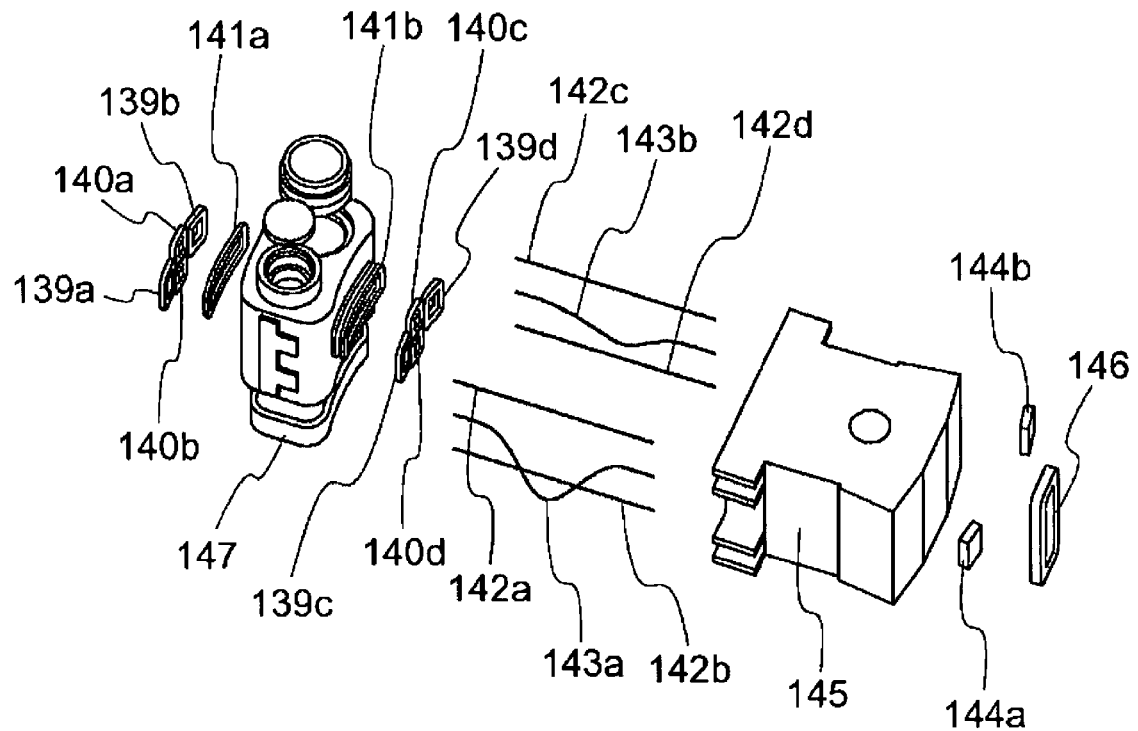
FIG. 13 is an exploded perspective view indicating the movable portion of the optical-system driving device in FIG. 12.
Figure 14:
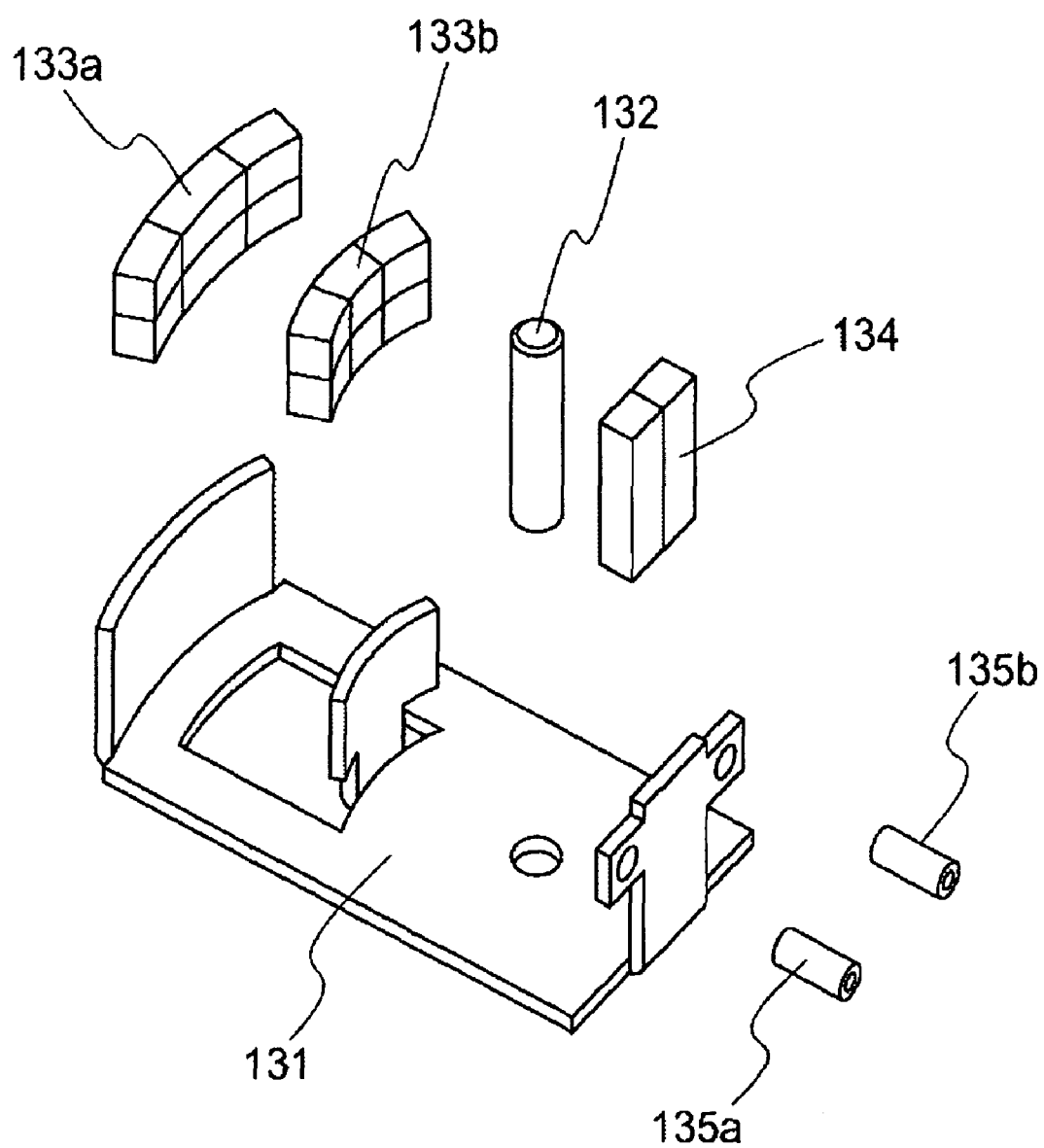
FIG. 14 is an exploded perspective view indicating the stationary portion of the optical-system driving device in FIG. 12.

FIG. 8 is a perspective view illustrating an optical-system driving device in a state where a first optical means is selected, in Embodiment 2; FIG. 9 illustrates three plan views of the optical-system driving device in FIG. 8; FIG. 10 is a perspective view illustrating an optical-system driving device in a state where a second optical means is selected, in Embodiment 2; FIG. 11 illustrates three plan views of the optical-system driving device in FIG. 10; FIG. 12 is a general perspective view separately indicating the movable and stationary portions of the optical-system driving device in Embodiment 2; FIG. 13 is an exploded perspective view indicating the movable portion of the optical-system driving device in FIG. 12; and FIG. 14 is an exploded perspective view indicating the stationary portion of the optical-system driving device in FIG. 12.

Embodiment 2 of the present invention will be described hereinafter with reference to the figures. Referring to FIGS. 8 through 14, a base is indicated at 131 (corresponding to the base 121 in Embodiment 1); a shaft, at 132 (corresponding to the shaft 122 in Embodiment 1); a focus control magnet, a tracking control magnet and a tilt control magnet, at 133a and 133b (corresponding to the permanent magnets 112a and 112b in Embodiment 1); a switchover magnet, at 134 (corresponding to the magnets for pivotal movement 123a and 123b in Embodiment 1); and magnetic substances, at 135a and 135b (corresponding to the adjust screws 124a and 124b in Embodiment 1). A first objective lens is indicated at 136 (corresponding to the objective lens 103 in Embodiment 1); a second objective lens, at 137 (corresponding to the objective lens 104 in Embodiment 1); a lens holder, indicated at 138 (corresponding to the objective lens 105 in Embodiment 1), retains objective lenses 136 and 137; focus coils, at 139a through 139d (corresponding to the focus coils 106a through 106d in Embodiment 1); tracking coils, at 140a through 140d (corresponding to the tracking coils 107a through 107d in Embodiment 1); and tilt coils, at 141a through 141d (corresponding to the tilt coils 108a and 108b in Embodiment 1). First conductive elastic members are indicated at 142a through 142d, and second conductive elastic members, at 143a and 143b (the first and the second conductive elastic members corresponding to the elastic members 115a through 115f); magnetic pieces, at 144a and 144b; a supporting holder, at 145; a switchover coil, at 146 (corresponding to the coils for pivotal movement 118a and 118b in Embodiment 1); a balancer, at 147; and a power supply means, at 148.

A base 131, made of a magnetic metal material, is provided with an opening for the beam of light to pass therethrough, not shown. A shaft 132 is fixed to the bottom surface of the base 131 by press-fitting or adhesion. The magnets 133a and 133b, are magnetized in a multi-pole configuration—i.e., two split in the focus direction and three split in the tracking direction—so that neighboring magnets have a different pole with each other; the magnets 133a and 133b are fixed to a first wall 131a and a second wall 131b, respectively. As shown in FIG. 9(c), both magnets 133a and 133b are configured to be narrower in the focus direction than that of the lens holder 138; the lens holder 138 has portions projecting from both end portions of the magnets 133a and 133b in each of the focus direction. The magnets 133a and 133b are split into two parts so that their poles differ mutually, up and down (a recording medium side is assigned as "up" and a bottom surface side of the base 131, as "down") with a parting line in the vicinity of the center of gravity in the focus direction of the lens holder 138. In addition, referring to FIG. 9(c) and FIG. 12, a portion of the second wall 131b, to which the magnet 133b is fixed, has substantially the same width as that of the magnet 133b, as viewed from the focus and tracking directions. Furthermore, a portion from the upper portion of the fixing base bottom plate of the second wall 131b to the lower end surface of the permanent magnet is formed into a bow both of which ends in the tracking direction are bowed inward more than those of the permanent magnet; the portion is extended from the base 131 with the width thereof narrower than that of the above described magnet-fixed portion. The magnet 134 is magnetized so that the poles of neighboring magnets split into two in the tracking direction may differ with each other, being fixed to a third wall 131c of the base 131. The magnetic members, indicated at 135a and 135b, are made of a magnetic material, part of which is formed with a thread portion; the magnetic members are held by the third wall 131c of the base 131 in such a way that an amount thereof projected from the wall is adjustable. The magnetic members 135a and 135b are magnetized by the magnetic field of the magnet 134.

The objective lenses 136 and 137 focus the beams of light, not shown, onto an optical disk, e.g., for use on BDs (blue ray disks) and HD-DVDs, respectively; they are fixed on the lens holder 138. As shown in FIG. 13, the focus coils, indicated at 139a through 139d and the tracking coils, at 140a through 140d, are provided on the lens holder 138 so as to be opposite the magnets 133a and 133b, respectively. Furthermore, the lens holder 138 is provided with the tilt coils 141a and 141b so that they are opposite the magnets 133a and 133b. When the objective lens 136 or the objective lens 137 is selected, the respective coils described above are disposed so as to perform the desired action by interaction with the magnets. Furthermore, a balancer 147 is fixed to the lens holder 138.

First ends of the conductive elastic members 142a through 142d are fixed to the lens holder 138; each combination of two members is connected to the above-described focus coils 139 and tracking coils 140. Second ends of the above-described conductive elastic members 142a through 142d are connected with a base plate, not shown, being fixed to the support holder 145. The lens holder 138 is supported onto the support holder 145 by means of these conductive elastic members 142a through 142d. In addition, first ends of the second conductive elastic members 143a and 143b are fixed to the lens holder 138, being connected with tilt coils 141. Second ends of the above-described second conductive elastic members 143a and 143b are connected with the unillustrated plate, being fixed to the support holder 145. The above-described second conductive elastic members 143a and 143b are sufficiently longer than the precedingly described conductive elastic members 142a and 142b, being fixed so that force may not be exerted on between the lens holder 138 and the support holder 145. In addition, as shown in FIG. 9(c), the conductive elastic members 142a and 142c are disposed above the magnet 133b as viewed from the focus direction; the conductive elastic members 142b and 142d are disposed below the magnet 133b as viewed from the focus direction. Furthermore, the second conductive elastic members 143a and 143b are configured so as not to contact any of the conductive elastic members 142*a* through 142*d*. Moreover, as described above, the second conductive elastic members 143*a* and 143*b* are sufficiently longer in length than the conductive elastic members 142*a* and 142*b*; as has been shown in FIG. 9(*b*), the elastic members are fixed onto the lens holder 138 and the support holder 145 while being bent outwardly with respect to the holders. This configuration ensures that the conductive elastic members 142*a* through 142*d*, 143*a* and 143*b* have no contact with the permanent magnet 133*b* even when the support holder 145 rotates about the shaft 132 in order to switch over between the objective lenses 136 and 137.

As shown in FIG. 13, the switchover coil, indicated at 146, is fixed to the support holder 145 so as to be opposite the magnet 134; the magnetic pieces, indicated at 144*a* and 144*b*, are fixed on both sides of the switchover coil 146 on the support holder 145; the power supply means, indicated at 148, is connected via the conductive elastic members 142*a* through 142*d* and 143*a* and 143*b* to the focus coils 139, the tracking coil 140 and the tilt coil 141.

Next, the operation will be described below. Displacement, in the direction of the focal point, of the focus spot formed on the optical disk, not shown, using the objective lens 136 is sensed using a focus sensor—based on the known anastigmatic method or the like—provided on an unillustrated optical head; the focus coils 139*a* through 139*d* are energized by a current according to the displacement amount; the lens holder 138 is moved in the direction of the optical axis of the objective lens 136 by the electromagnetic interaction between the focus coils and the magnets 133*a* and 133*b*, thus effecting focus control.

Figure 15:
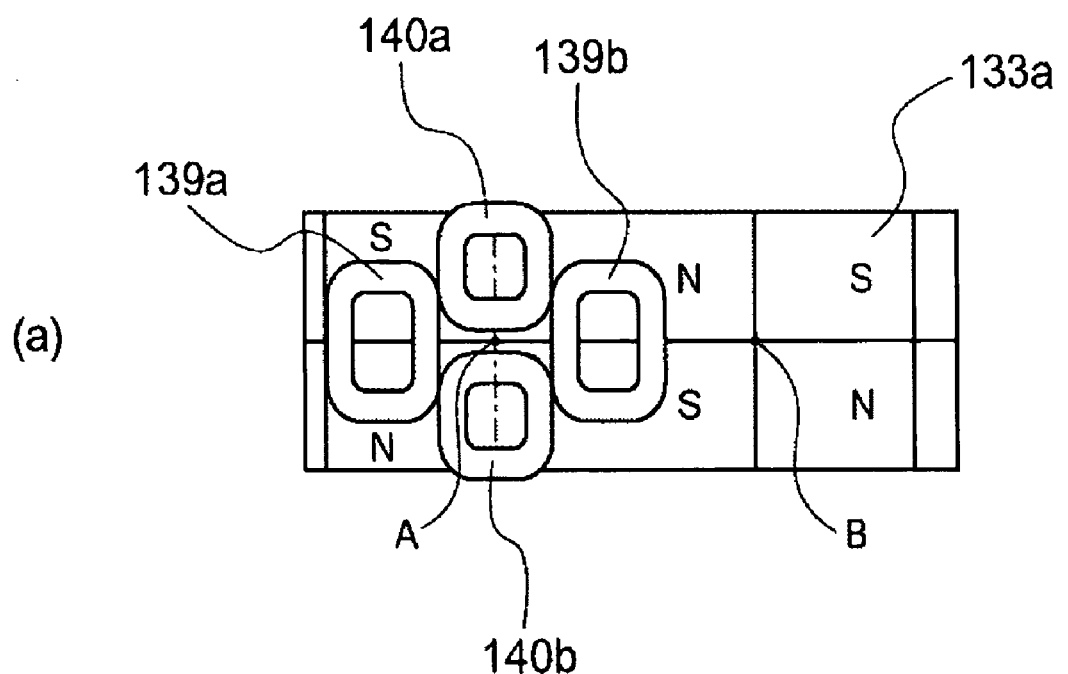
FIG. 15(*a*) is a view illustrating positional relationships among focus and tracking coils and permanent magnets in the state where the first optical means is selected; likewise, FIG. 15(*b*) is a view illustrating a positional relationship between a tilt coil and permanent magnets.
Figure 15:
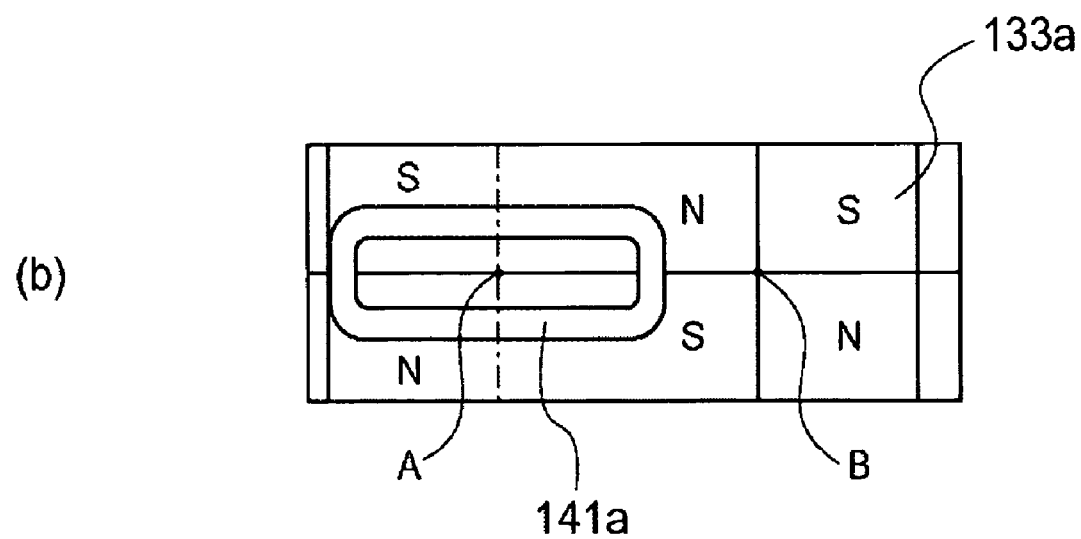

FIG. 15(*a*) is a view illustrating positional relationships among the focus coils 139*a* and 139*b*, the tracking coils 140*a* and 140*b*, and the magnet 133*a* during a time when the objective lens 136 is selected. As shown in the figure, in performing focus operation, because the magnetic poles of the magnets differ in the upper and lower portions at the midpoint of the left and right sides of each coil, energization of the focus coils 139*a* and 139*b* causes the electromagnetic forces to be exerted on the left and right sides, to mutually cancel as a whole; in contrast, because of the magnetic poles being mutually different on the upper and lower sides, the forces to be exerted coincides in the upward or downward direction depending on the current direction, to move the lens holder in the focus direction.

Figure 16:
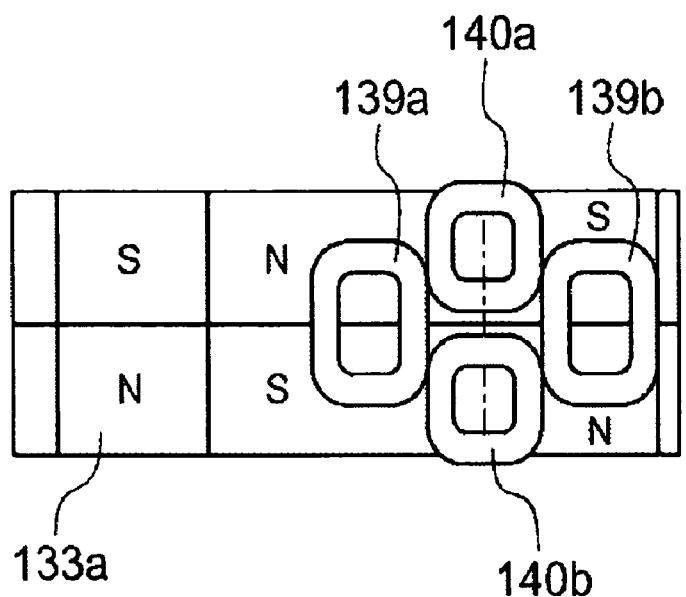
FIG. 16(*a*) is a view illustrating positional relationships among the focus and tracking coils and the permanent magnets in the state where the second optical means is selected; likewise, FIG. 16(*b*) is a view illustrating a positional relationship between the tilt coil and the permanent magnets.
Figure 16:
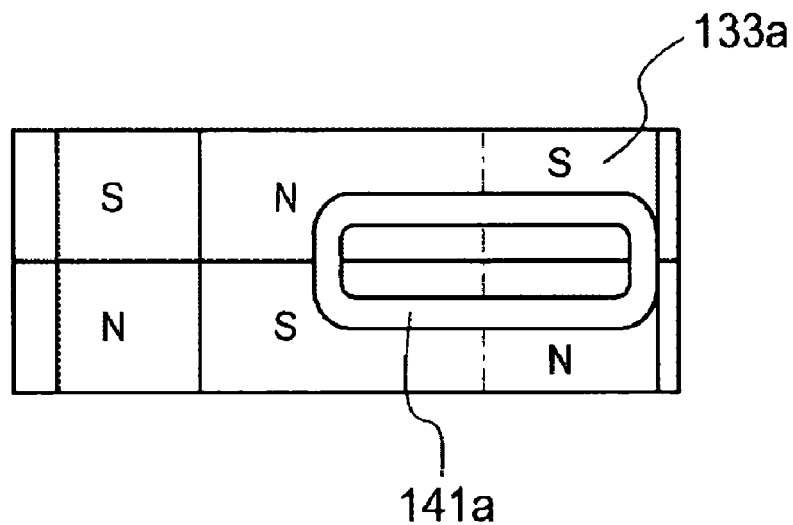

FIG. 16(*a*) illustrates positional relationships among the focus coils 139*a* and 139*b*, and the tracking coils 140*a* and 139*b* and the magnet 133*a* in the state where the objective lens 137 is selected. Description of the operation is omitted because of being the same to that during a time when the objective lens 136 is selected.

Displacement of the focus spot from a desired track, in the tracking direction is sensed using a tracking sensor—based on the known differential push-pull method or the like—provided on the unillustrated optical head; the tracking coils 140*a* through 140*d* are energized by a current according to the displacement amount; the lens holder 138 is moved in the tracking direction orthogonal to the optical axis of the objective lens 136, by the electromagnetic interaction between the tracking coils 140*a* through 140*d* and the magnets 133*a* and 133*b*, thus effecting tracking control. As has been shown in FIG. 15(*a*), during a time when the objective lens 136 is selected, the magnetic poles of the magnets are different from each other at the midpoint of the upper and lower sides of the tracking coils; thus, even if in this situation, current flows through the tracking coils 140*a* and 140*b*, the electromagnetic force exerted on the upper and lower sides mutually cancel as a whole. In contrast, because the magnetic poles of the magnets located opposite the tracking coils differ at the left and right sides, the forces to be exerted coincide in the leftward or rightward direction depending on the current direction, to move the lens holder in the tracking direction. This holds for the operation in selecting the objective lens 137.

In addition, a relative tilt between the unillustrated optical disk and the objective lens 136 is sensed; the tilt coils 141*a* and 141*b* are energized by a current according to an amount of the tilt; electromagnetic interaction between the coils and the permanent magnets 133*a* and 133*b* causes the lens holder 138 to be tilted in the tracking direction of the objective lens 136, thereby performing tilt control.

FIG. 15(*b*) is a view illustrating a positional relationship between the tilt coil 141*a* and the magnet 133*a* during a time when the objective lens 136 is selected; FIG. 16(*b*) is a view illustrating a positional relationship between the tilt coil 141*a* and the magnet 133*a* during a time when the objective lens 137 is selected. For example, as has been shown in FIG. 15(*b*), the magnetic poles of the magnets are reversed at the upper and lower sides of the tilt coils, and the mutually opposing forces at the left portion and right portion of the sides—e.g., an upward force is exerted on the left portion of the side; a downward force on the right portion of the side—act upon each other; thus, the tilt coils rotate about the axis perpendicular to both the tracking and the focus directions.

Figure 17:
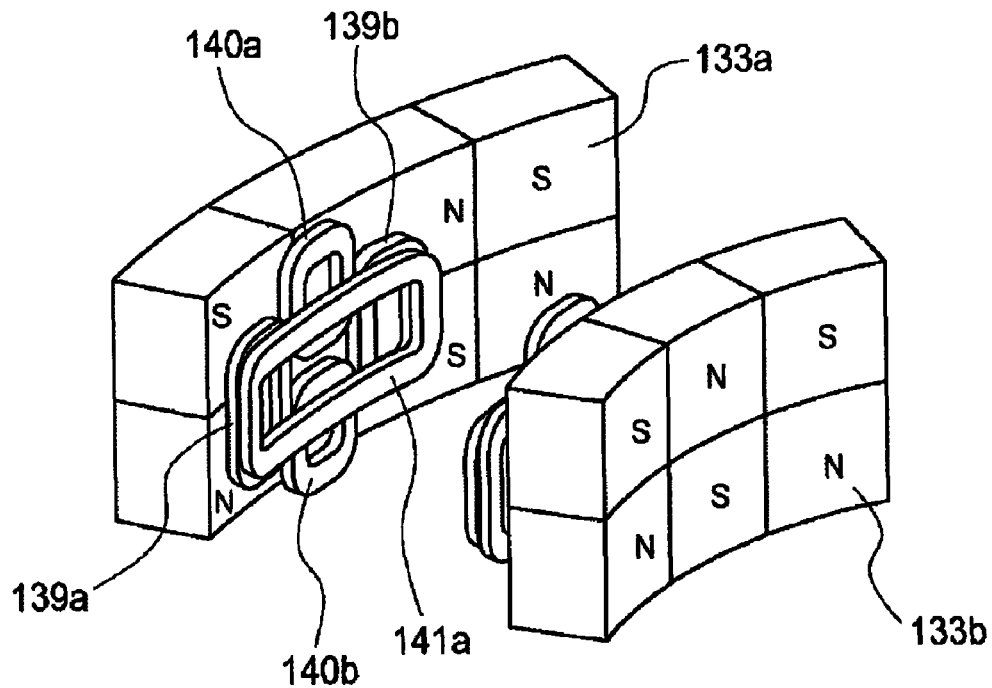
FIG. 17 is a perspective view illustrating a positional relationship between the coils and the permanent magnets in the state where the first optical means is selected.
Figure 18:
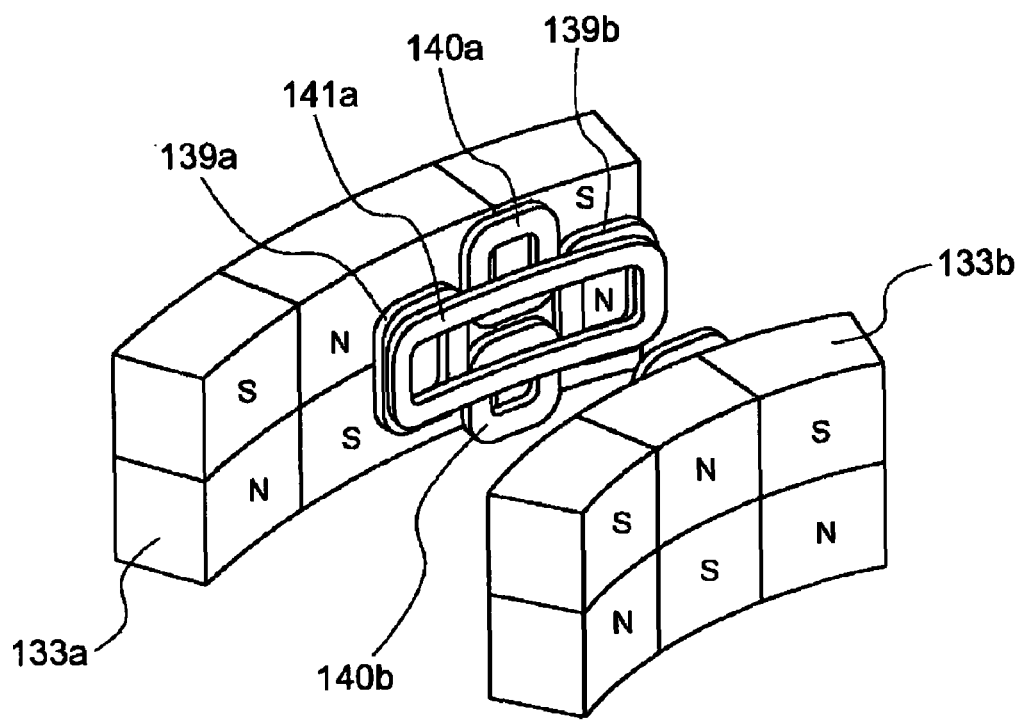
FIG. 18 is a perspective view illustrating a positional relationship between the coils and the permanent magnets in the state where the second optical means is selected.

Shown in greater detail in FIGS. 17 and 18 are positional relationships among the focus coils 139*a* through 139*d*, the tracking coils 140*a* through 140*d*, and the tilt coils 141*a* and 141*b* and the magnets 133*a* and 133*b*. FIG. 17 and FIG. 18 illustrate views during a time when the objective lenses 136 and 137 are selected, respectively.

The center of gravity of the movable portion centered on the lens holder 138 is aligned by the balancer 147 so as to be substantially in the midpoint between the objective lenses 136 and 137 with respect to the horizontal plane thereof, and substantially in the center of the lens holder 138 with respect to the perpendicular plane thereof.

In performing the focus control, the focus coils 139*a* through 139*d* are energized by a current; in a state shown in FIG. 8 (in a state where the objective lens 136 is selected), the resultant of drive forces produced between the focus coils 139*a* through 139*d* and the magnets 133*a* and 133*b*—the coils and the magnets face each other—is configured to act together substantially on the above-described center of gravity; in a state shown in FIG. 10 (in a state where the objective lens 137 is selected) as well, the resultant of drive forces produced between the focus coils 139*a* through 139*d* and the magnets 133*a* and 133*b*—the coils and the magnets face each other—is configured to act together substantially on the above-described center of gravity.

In contrast, in performing the tracking control, the tracking coils 140*a* through 140*d* are energized by a current; in a state shown in FIG. 8 (in a state where the objective lens 136 is selected), the resultant of drive forces produced between the tracking coils 140*a* through 140*d* and the magnets 133*a* and 133*b*—where the coils and the magnets face each other—is configured to act substantially on the above-described center of gravity; in a state shown in FIG. 10 (in a state where the objective lens 137 is selected) as well, the resultant of drive forces produced between the tracking coils 140*a* through 140*d* and the magnets 133*a* and 133*b*—where the coils and the magnets face each other—is configured to act substantially on the above-described center of gravity.

Stated another way, with the center of gravity—aligned by the balancer 147 in a manner described above—being assigned as the midpoint, the focus coils 139*a* through 139*d* are disposed symmetrically. It holds for the tracking coils 140*a* through 140*d*. In addition, the boundary of the magnetic poles of the magnets 133*a* is placed so that when the objective lens 136 is selected, as shown in FIG. 15(*a*), the boundary A of magnetic poles of the magnets 133*a* is substantially opposite the center of gravity of the lens holder 138, and when the objective lens 137 is selected, the boundary B of magnetic poles of the magnets 133*a* is substantially opposite the center of gravity of the lens holder 138. It holds for the magnet 133*b*.

In the state shown in FIG. 8—the state where the objective lens 136 is selected—a magnetic material 144*a* on the support holder 145 is held onto the third wall of the base 131, making contact with and being magnetically fixed to the magnetic member 135*a* magnetized by the magnet 134. Accordingly, even though the lens holder 138 is driven and controlled in the focus, tracking, and tilt directions, and vibrations are transferred to the support holder 145 by way of the conductive elastic members 142*a* through 142*d*, the support holder 145 will not move, thus producing no reaction force, which causes no detrimental effect on the drive and control operations in the focus, tracking and tilt directions.

In addition, varying an amount of protrusion of the magnetic member 135*a* from the third wall 131*c* of the base 131 allows alignment of a position to which the support holder 145 is fixed, thereby enabling the objective lens 136 to be disposed at an optically optimal position. Reference is made to FIG. 9(*b*); increasing the protrusion amount of the magnetic member 135*a* causes an objective-lens-136-fixing position to shift clockwise about the shaft 132, compared with the position prior to increasing the protrusion amount; conversely, reducing the protrusion amount causes the objective-lens-136-fixing position to shift counterclockwise about the shaft 132, compared with the position prior to decreasing the protrusion amount; as a result, by thus adjusting the protrusion amount, the objective lens 136 can be disposed in the optimal position. Furthermore, as for the magnetic member 135*b* as well, varying the amount of protrusion from the third wall 131*c* of the base 131 allows alignment of a position to which the support holder 145 is fixed, thereby enabling the objective lens 137 to be disposed at an optically optimal position.

When switchover is made from the objective lens 136 to the objective lens 137, in the state as shown in FIG. 8 the switchover coil 146 is energized by a current, and a rotation drive force is produced by electromagnetic interaction with the magnet 134; magnetic coupling between the magnetic member 144*a* on the support holder 145 and the magnetic piece 135*a* held by the base 131 is cancelled to thereby make the support holder 145 free to rotate, consequently causing the support holder 145 to rotate about the shaft 132. The support holder 145 rotates until the magnetic material 144*a* on the support holder 145 is held onto the third wall of the base 131 and magnetically firmly fixed to the magnetic member 135*b* magnetized by the magnet 134; at that position, the support holder is made stationary, with the objective lens 137 being selected.

Figure 19:
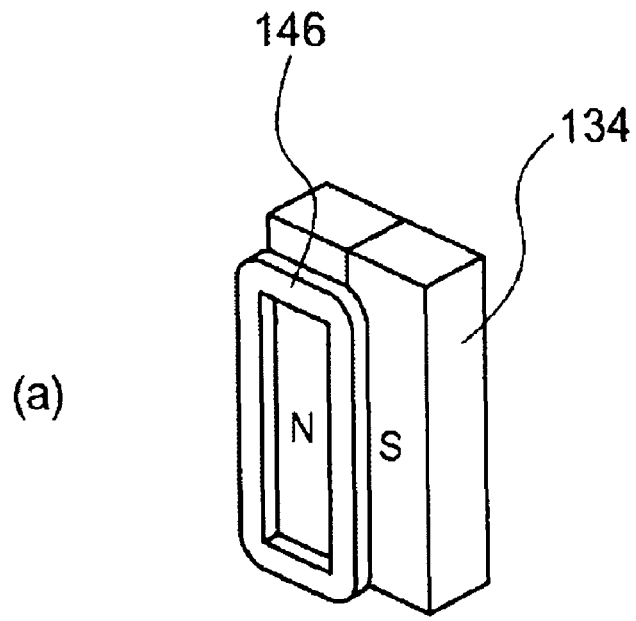
FIG. 19 is a set of views illustrating a positional relationship between the switchover coil and the switchover magnet in the state where the first optical means is selected.
Figure 19:
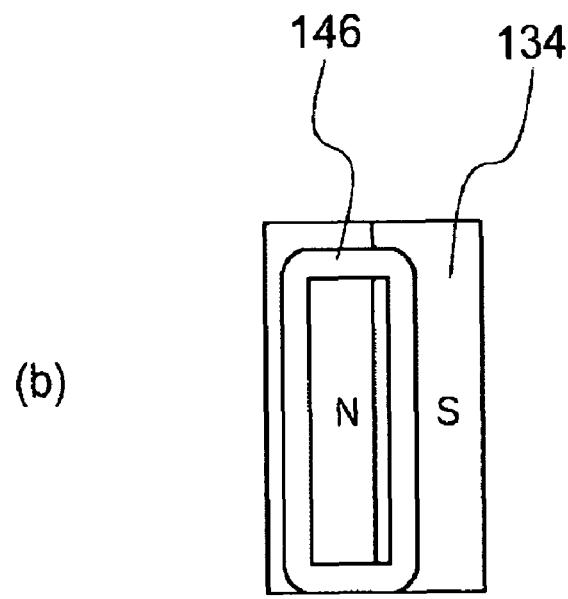
Figure 20:
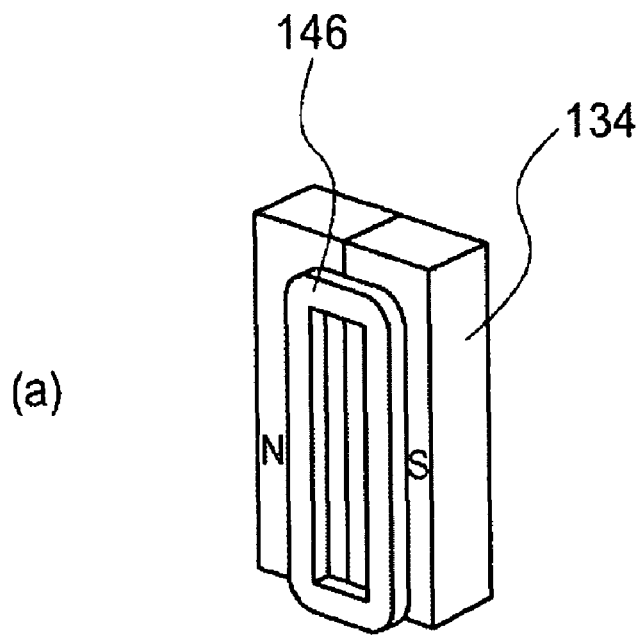
FIG. 20 is a set of views illustrating a positional relationship between a switchover coil and a switchover magnet in the state where the second optical means is selected.
Figure 20:
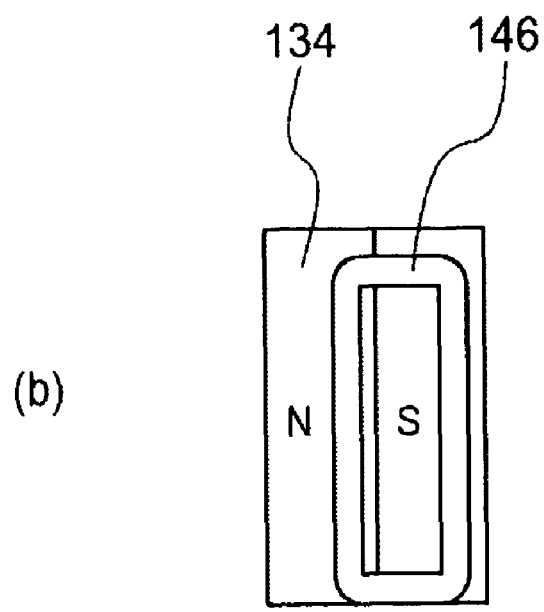

FIG. 19(*a*) is a perspective view illustrating a positional relationship between the switchover coil 146 and the switchover magnet 134 in the state where the objective lens 136 is selected; FIG. 19(*b*) is a plan view as viewed from the coil side in the same way; FIGS. 20(*a*) and 20(*b*) are a perspective view illustrating a positional relationship between the switchover coil 146 and the switchover magnet 134 in the state where the objective lens 137 is selected, and a plan view as viewed from the coil side, respectively. As shown in FIGS. 19 and 20, in either case, the magnetic poles of the switchover magnet 134 opposite the switchover coil 146 differ at the right side and the left side; thus electromagnetic force for switchover is applied to the support holder 145 every time during switching over, which thereby provides sufficient force that cancels magnetism between the magnetic member 144*a* and the magnetic piece 135*a*; thus, the switchover can be made smoothly.

In the state shown in FIG. 10—the state where the objective lens is selected—the magnetic material 144*b* on the support holder 145 is held onto the third wall of the base 131, being magnetically fixed to the magnetic member 135*b* magnetized by the magnet 134. Accordingly, even though the lens holder 138 is driven and controlled in the focus, tracking, and tilt directions, and vibrations are transferred to the support holder 145 by way of the conductive elastic members 142*a* through 142*d*, the support holder 145 will not move, thus producing no reaction force, which causes no detrimental effect on drive control operations in the focus, tracking and tilt directions. In addition, by varying an amount of protrusion of the magnetic member 144*b* from the third wall of the base 131, a positional point where the support holder 145 is fixed can be adjusted, which in turn enables the objective lens 137 to be disposed at an optically optimum position.

Next, operation will be described below. Displacement in the direction of the focal point, of the focus spot formed on an unillustrated optical disk using the objective lens 137 is sensed with a focus sensor—based on the known anastigmatic method or the like—provided on the optical head, not shown; the focus coils 139*a* through 139*d* are energized by a current according to the displacement; the lens holder 138 is moved in the direction of the optical axis of the objective lens 137 by the electromagnetic interaction between the focus coils and the magnets 133*a* and 133*b*, thus effecting focus control.

In addition, displacement of the focus spot from a desired track in the tracking direction is sensed with a tracking sensor—based on the known differential push-pull method or the like—provided on the optical head, not shown; the tracking coils 140*a* through 140*d* are energized by a current according to the displacement, whereby the lens holder 138 is moved in the tracking direction orthogonal to the optical axis of the objective lens 137 by the electromagnetic interaction between the tracking coils and the magnets 133*a* and 133*b*, thus effecting tracking control.

In addition, a relative tilt between the unillustrated optical disk and the objective lens 137 is sensed; the tilt coils 141*a* through 141*d* are energized by a current according to the amount of tilt, whereby the lens holder 138 is tilted in the tracking direction by the electromagnetic interaction between the tilt coils and the magnets 133*a* and 133*b*, thus effecting tilt control.

Regardless of either of the objective lens 136 or 137 is selected, the first conductive elastic members 142*a* through 142*d* and the second conductive elastic members 143*a* and 143*b* are disposed at positions spaced apart height-wise so as not to make contact with the magnet 133*b*.

Placement of a lubricant member such as a POLYSLIDER (trade name) between the support holder 145 and the base 131, which is not shown in the figure, enables the support holder 145 to be pivotally driven smoothly without influence of friction when the switchover is made between the objective lenses 136 and 137.

As has been described above, according to Embodiment 2 of the present invention, the optical-system driving device having a plurality of objective lenses is switched from one to the other by driving the support holder for supporting the lens holder having the plurality of objective lenses when the switchover is made between the plurality of objective lenses.

In performing respective actions—tracking, focusing and tilting—a configuration is implemented such that only the above-described lens holder can be driven with respect to the support holder; consequently, a low-cost and space-saving optical-system driving device can be provided without a need for a space-consuming and complex switchover device.

Embodiment 3

Figure 21:
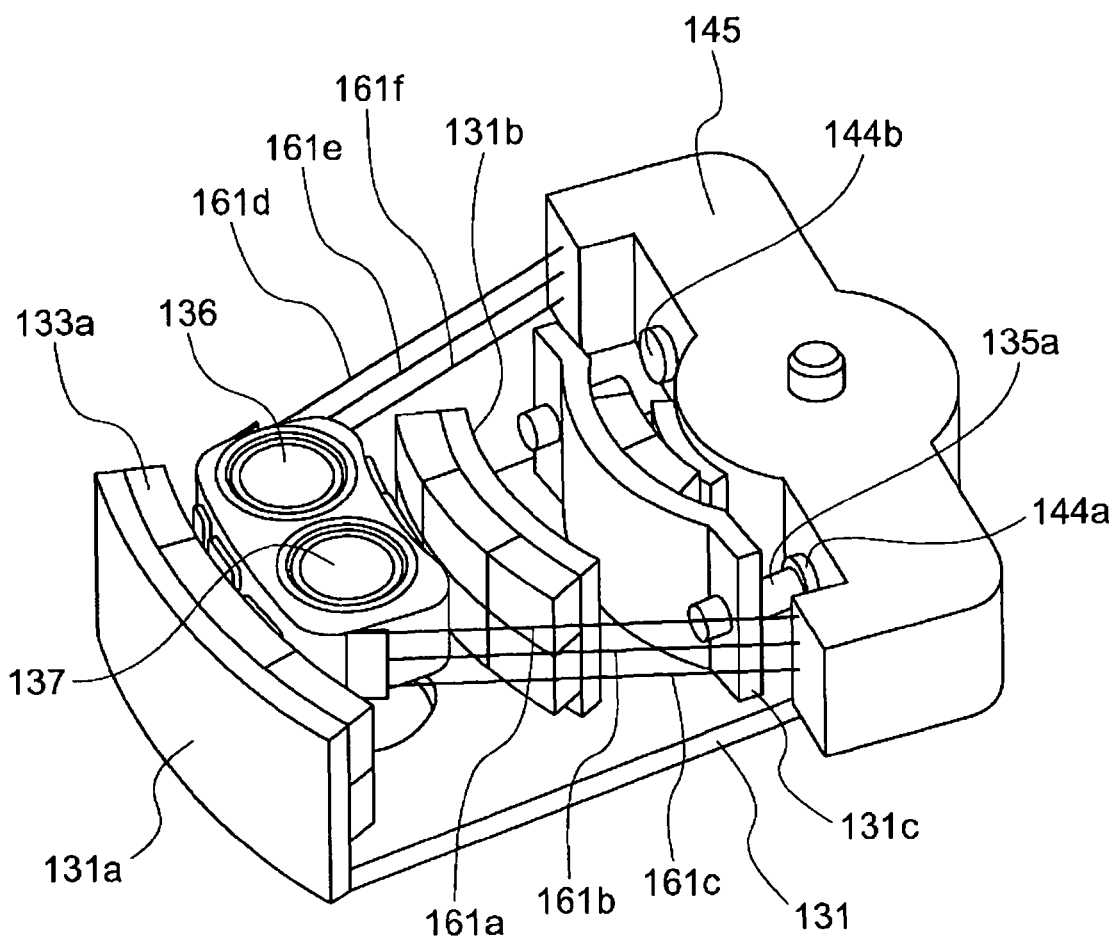
FIG. 21 is a perspective view illustrating an optical-system driving device in a state where a first optical means of the present invention is selected, in Embodiment 3.
Figure 22:
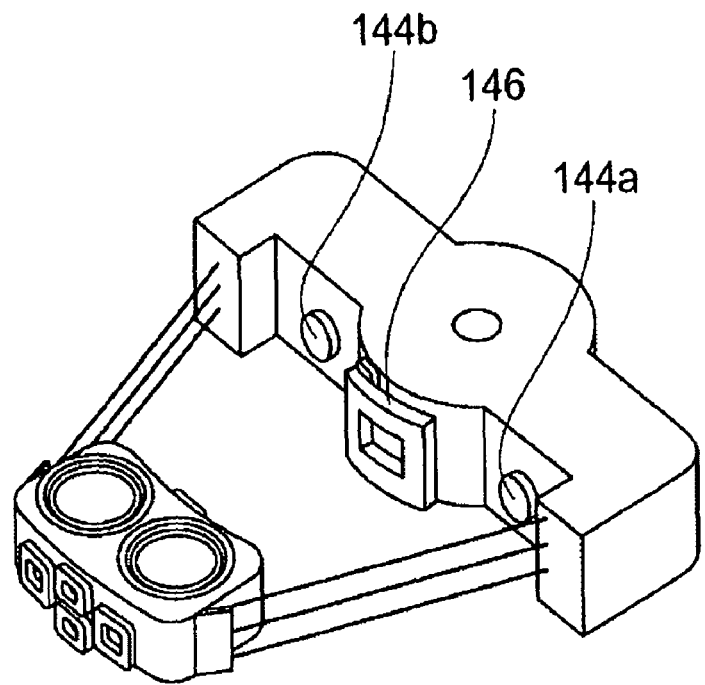
FIG. 22 is an exploded perspective view illustrating a base and a movable portion in Embodiment 3.
Figure 22:
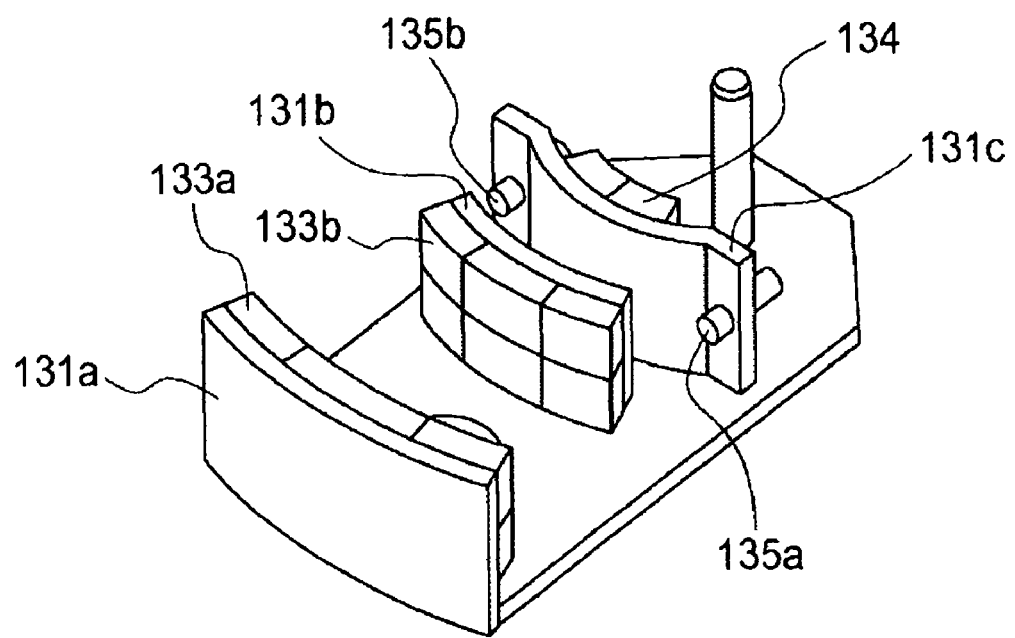

FIG. 21 is a perspective view illustrating an optical-system driving device in a state where a first optical means is selected, in Embodiment 3 of the present invention; FIG. 22 is an exploded perspective view illustrating a device base and a movable portion of the optical-system driving in Embodiment 3.

Embodiment 3 of the present invention will be described hereinbelow referring to the figures. Here, identical numerals are applied to constitutional elements that are same as those shown in Embodiment 2. Referring to FIGS. 21 and 22, first ends of the conductive elastic members, indicated at 161a through 161f, are fixed to the lens holder 138; each combination of two members is connected to the above-described focus coil 139, tracking coil 140 and tilt coil 141. Second ends of the above-described conductive elastic members 161a through 161e are connected with a base plate, not shown, being fixed to the support holder 145. The lens holder 138 is supported onto the support holder 145 by means of these conductive elastic members 161a through 161f.

The second wall 131b onto which the magnet 133b is fixed does not have the lower recess in a manner shown in Embodiment 2 described above; the lower end of the magnet 133b is disposed directly above the bottom plate of the base 131. In addition, the width of the magnet 133a in the focus direction is also configured to be the same as that of the magnet 133b; a positional relationship between the magnet 133a and the base 131 in the focus direction is substantially the same as that between the magnet 133b and the base 131. Furthermore, the width of the lens holder 138 in the focus direction is shorter than that in Embodiment 2 described above, being substantially equal to that of the magnets 133a and 133b.

Regardless of whether either of the objective lens 136 or 137 is selected, the conductive elastic members 161a through 161e are disposed so as not to make contact with the magnet 13b and so as to be widened in the tracking direction, at the support holder 145 more than at the lens holder 138—i.e., in a mutually oblique manner. Disposing the conductive elastic members 161a through 161f allows the reduction of the width of the lens holder 138 in the focus direction, which in turn enables the width of the first and second walls 131a and 131b in the focus direction to be reduced, accordingly.

In the optical-system driving device according to Embodiment 3, the third wall 131c of the base 131 is disposed between the second wall 131b and the support holder 145; the switchover magnet 134 is fixed to a wall that is opposite the support holder 145 of the third wall 131c. In addition, the support holder 145 is disposed with the switchover coil 146 at a position facing each other with this the switchover magnet 134. Furthermore, both ends of the third wall 131c are provided with the magnetic members 135a and 135b having screws similar to those in Embodiment 2 described above, in such a way that the magnetic members can protrude from the third wall. In addition, when each of the objective lenses 136 and 137 is selected, magnetic pieces 144a and 144b that magnetically couple with the magnetic members 135a and 135b, to thereby make the support holder 145 stationary, are disposed on both sides of the switchover coil 146, respectively. As with Embodiment 2 described above, when the objective lens 136 is selected, adjustment of the protrusion amount of the magnetic member 135b can move the fixing position of the support holder 145, to arrange the objective lens 136 at an optically optimal position; when the objective lens 137 is selected, adjustment of the protrusion amount of the magnetic 135a allows the objective lens 136 to be located at an optically optimal position.

Descriptions on actions of the focus control, tracking control and tilt control with the coils and the permanent magnets are omitted because of being common to those shown in Embodiment 2 described above.

In Embodiment 3 of the present invention, the electromagnetic interaction between the magnets and the coils has been used for a rotation drive action of the support holder 145 for the switchover between the objective lenses 136 and 137; however, a rotation drive device such as a motor may be used; ditto for Embodiment 2 described above.

As described precedingly, according to Embodiment 3 of the present invention, the optical-system driving device having a plurality of objective lenses is switched between them by driving the support holder for supporting the lens holder having the plurality of objective lenses when the switchover is made between the plurality of objective lenses; a configuration is implemented such that when the respective actions—the tracking, focusing and tilting—are performed, only the above-described lens holder can be driven with the support holder being fixed; thus an advantageous effect is that as well as parts count, assembly time required can be reduced. As a result, a low-cost and space-saving optical-system driving device can be provided without a need for a space-consuming and complex switchover device.

Industrial Applicability

The present invention is applicable to an optical disk drive, such as a DVD (digital versatile disk) recorder, for recording information onto or playing it back from an optical storage medium.

What is claimed is:

1. An optical-system driving device for recording information onto and playing back the same from an optical storage medium, comprising:
   a stationary unit having a rotation axis;
   a movable unit pivotable about the rotation axis;
   a pivotal movement device for pivotally moving the movable unit about the rotation axis, said pivotal movement device including at least one magnet opposing at least one coil; and
   a rotation-amount-limiting device for limiting an amount of rotation including at least one magnetic piece opposing at least one magnetizable portion,
   wherein the movable unit includes a holder having a plurality of optical devices that is able to focus a beam of light onto the optical storage medium, and a plurality of conductive elastic members for supporting the holder, the optical axis of each of the plurality of optical devices is substantially equidistant from the rotation axis,
   by pivotally moving the movable unit with the pivotal movement device, one of the optical devices for focusing the beam of light onto the optical storage medium is selected, and
   said at least one magnetizable portion is magnetized by said at least one magnet of said pivotal movement device to limit the amount of rotation of said movable unit.

2. The optical-system driving device of claim 1, wherein the movable unit includes a drive unit for driving the holder, the drive unit includes the plurality of conductive elastic members, a plurality of magnets disposed in the movable unit, and a plurality of coils disposed on a holder side opposite the magnets.

3. The optical-system driving device of claim 2, wherein:
the plurality of optical devices is mounted on the surface of the holder, opposite the optical storage medium;
the plurality of coils is each mounted in a position more distant from the optical storage medium than the surface where the plurality of optical devices is disposed;
an end portion of each of the plurality of conductive elastic members is fixed at a position more distant from the optical storage medium than the surface where the plurality of optical devices is disposed; and
the plurality of coils is energized by way of the conductive elastic members.

4. The optical-system driving device of claim 1, further comprising a drive unit for driving the holder, wherein the drive unit includes the plurality of conductive elastic members, a plurality of magnets disposed on the stationary unit, and a plurality of coils disposed on the holder surface opposite the magnets.

5. The optical-system driving device of claim 4, wherein:
the plurality of optical devices is mounted on the holder surface opposite the optical storage medium;
the plurality of coils is each mounted in a position more distant from the optical storage medium than the surface where the plurality of optical devices is disposed;
an end portion of each of the plurality of conductive elastic members is fixed at a position more distant from the optical storage medium than the surface where the plurality of optical devices is disposed; and
the plurality of coils is energized by way of the conductive elastic members.

6. The optical-system driving device of claim 2 or claim 4, wherein the plurality of conductive elastic members forms a pair of groups each of which includes an equal number of conductive elastic members, and each of the conductive elastic members that constitute a pair is disposed at a position substantially equal to each other with respect to the optical axis direction.

7. The optical-system driving device of claim 1, wherein the optical axis is positioned between a rotation central axis of the optical storage medium and the rotation axis.

8. The optical-system driving device of claim 2 or claim 4, wherein the plurality of coils includes:
a plurality of focus coils for driving the holder in the direction of the optical axis;
a plurality of tracking coils for driving the holder in the tracking direction;
a plurality of tilt coils for driving the holder around an axis substantially perpendicular to the optical axis; and
each of the coils is disposed in a position substantially symmetrical with respect to a plane in parallel with the optical axis and intersecting the center of gravity of the holder.

9. The optical-system driving device of claim 1, wherein
said at least one magnetizable portion includes a pair of adjust screws located on lateral sides of said stationary unit near said at least one magnet of said pivotal movement device; and
said at least one magnetic piece is located on said movable unit.

10. An optical-system driving device for recoding information onto and playing back the same from an optical storage medium, comprising:
a stationary unit having a rotation axis;
a movable unit pivotable about the rotation axis; and
a pivotal movement device for pivotally moving the movable unit about the rotation axis,
wherein the movable unit includes:
a holder having a plurality of optical devices that is able to focus a beam of light onto the optical storage medium;
a plurality of conductive elastic members for supporting the holder; and
a sloped portion that protrudes toward the stationary unit, said sloped portion being provided at a portion of the movable unit facing the stationary unit,
wherein the optical axis of each of the plurality of optical devices is substantially equidistant from the rotation axis, and
wherein by pivotally moving the movable unit with the pivotal movement device, one of the optical devices for focusing the beam of light onto the optical storage medium is selected, and the moveable unit moves in the direction of the optical axis by contact between the sloped portion and the stationary unit.

* * * * *